United States Patent
Shimomura et al.

(10) Patent No.: US 11,397,881 B2
(45) Date of Patent: Jul. 26, 2022

(54) IMAGE PROCESSING APPARATUS

(71) Applicant: Riso Kagaku Corporation, Tokyo (JP)

(72) Inventors: Kenji Shimomura, Ibaraki (JP); Masahiro Kawashima, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 17/238,802

(22) Filed: Apr. 23, 2021

(65) Prior Publication Data

US 2021/0357713 A1   Nov. 18, 2021

(30) Foreign Application Priority Data

May 12, 2020 (JP) .............................. JP2020-083894
May 12, 2020 (JP) .............................. JP2020-083895
Feb. 26, 2021 (JP) .............................. JP2021-029398

(51) Int. Cl.
| | |
|---|---|
| *G06K 15/02* | (2006.01) |
| *G06K 15/10* | (2006.01) |
| *H04N 1/407* | (2006.01) |
| *H04N 1/405* | (2006.01) |
| *B41J 2/045* | (2006.01) |

(52) U.S. Cl.
CPC ...... *G06K 15/1881* (2013.01); *B41J 2/04593* (2013.01); *G06K 15/102* (2013.01); *H04N 1/4052* (2013.01); *H04N 1/4072* (2013.01)

(58) Field of Classification Search
CPC .............. G06K 15/1881; G06K 15/102; B41J 12/04593; H04N 1/4052; H04N 1/4072
See application file for complete search history.

(56) References Cited

U.S. PATENT DOCUMENTS

| | | | |
|---|---|---|---|
| 9,349,083 B2* | 5/2016 | Kikuta | ................ H04N 1/4051 |
| 2009/0268240 A1* | 10/2009 | Watanabe | ............ H04N 1/4052 |
| | | | 358/1.15 |

FOREIGN PATENT DOCUMENTS

JP    2016-13645    1/2016

* cited by examiner

*Primary Examiner* — Quang N Vo
(74) *Attorney, Agent, or Firm* — Greenblum & Bernstein, P.L.C.

(57) ABSTRACT

An image processing apparatus is equipped with: an image data receiving unit that receives image data; and a print data generating unit that generates multiple value data as print data by performing a halftone process on the image data and converting the image data into at least three values. The print data generating unit administers a halftone process that includes a density fluctuation suppressing process that results in the print data always including a zero value except for a case in which all of the pixels that constitute the image data are converted into a maximum value.

13 Claims, 17 Drawing Sheets

IMAGE PROCESSING APPARATUS

CROSS-REFERENCE TO RELATED APPLICATIONS

The present application claims priority under 35 U.S.C. § 119 to Japanese Patent Application No. 2020-083895, filed on May 12, 2020, Japanese Patent Application No. 2020-083894 filed on May 12, 2020 and Japanese Patent Application No. 2021-029398, filed on Feb. 26, 2021. The above applications are hereby expressly incorporated by reference, in their entireties, into the present application.

BACKGROUND OF THE INVENTION

1. Field of the Invention

The present invention is related to an image processing apparatus that administers a halftone process on image data.

2. Description of the Related Art

Conventionally, an ink jet printing apparatus that ejects ink from an ink jet head onto a printing medium which is being conveyed along a conveyance path has been proposed.

In such an ink jet printing apparatus, airflow is generated directly underneath an ink jet head due to a printing medium being conveyed.

In addition, if ink is continuously ejected from a nozzle of an ink jet head, droplets of ink are ejected accompanied by their own airflow. The airflow that accompanies the droplets of ink operates as a wall that obstructs the aforementioned airflow which is generated by the printing medium being conveyed. There are cases in which the airflow which is generated by the printing medium being conveyed hits the airflow that accompanies the droplets of ink, causing the airflow to be disrupted in a complex manner. The turbulence generated by the disruption of airflow may cause the landing positions of ink which is ejected from the ink jet head to shift from desired positions, resulting in density fluctuations which are called "wind ripple fluctuations".

Japanese Unexamined Patent Publication No. 2016-013645 proposes a method for correcting these density fluctuations. In this method, in the case a piece of image data is high resolution image data and the density is within a predetermined range, the resolution of the image data is converted to low resolution according to the degree of generation of the airflow that accompanies the droplets of ink, in order to cause the wind ripple fluctuations to become less prominent.

SUMMARY OF THE INVENTION

However, the aforementioned method which is disclosed in Japanese Unexamined Patent Publication No. 2016-013645 cannot be applied in the case that the image data originally has low resolution. In addition, in the method which is disclosed in Japanese Unexamined Patent Publication No. 2016-013645, granularity decreases because the ink droplet size is large in regions which are converted to low resolution, and further, there is a problem that tone jump occurs at boundary regions where the resolution of the image data is switched to low resolution. Tone jump is a phenomenon in which the gradation of an originally smooth gradation portion changes rapidly and appears as a striped pattern.

The present invention has been developed in view of the foregoing circumstances. It is an object of the present invention to provide an image processing apparatus which is capable of suppressing wind ripple fluctuations even in low resolution image data without causing a deterioration in granularity or tone jump.

An image processing apparatus of the present invention is equipped with: an image data receiving unit that receives image data; and a print data generating unit that generates multiple value data as print data by performing a halftone process on the image data and converting the image data into at least three values. The print data generating unit administers a halftone process that includes a density fluctuation suppressing process that results in the print data always including a zero value except for a case in which all of the pixels that constitute the image data are converted into a maximum value.

According to the image processing apparatus of the present invention, when performing a halftone process on image data and converting the image data into at least three values to generate multiple value data, the halftone process is administered such the print data always includes a zero value except for a case in which all of the pixels that constitute the image data are converted into a maximum value. Therefore, it becomes possible to suppress wind ripple fluctuations even in low resolution image data without causing a deterioration in granularity or tone jump.

DETAILED DESCRIPTION OF THE EMBODIMENTS

Figure 1:
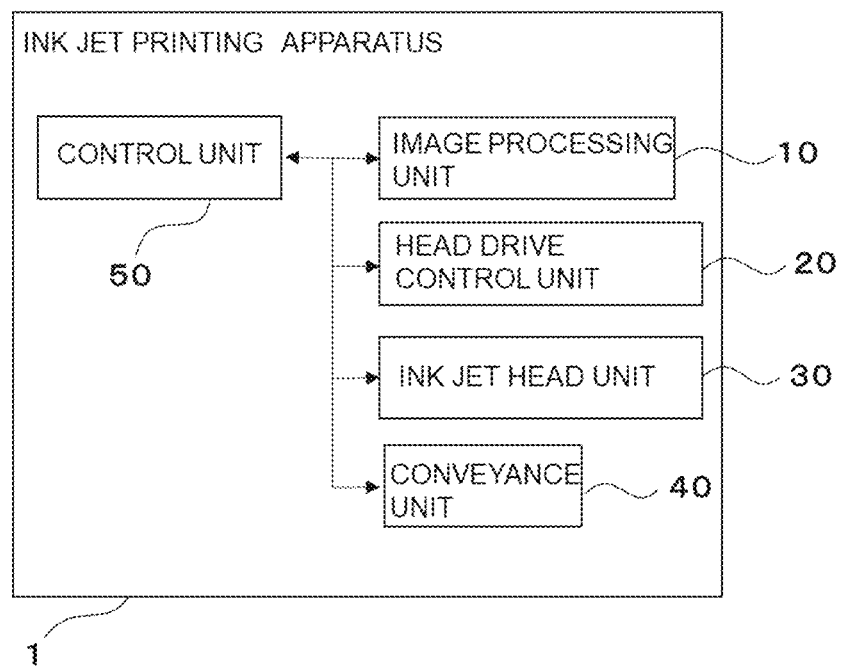
FIG. 1 is a block diagram that illustrates the configuration of an ink jet apparatus that employs an image processing apparatus according to a first embodiment of the present invention.

Hereinafter, an ink jet printing apparatus 1 that employs a first embodiment of the image processing apparatus of the present invention will be described in detail with reference to the drawings. FIG. 1 is a schematic diagram that illustrates the configuration of the ink jet printing apparatus 1 of the present embodiment.

The ink jet printing apparatus 1 ejects ink onto a printing sheet based on image data which is output from a computer or image data output from a document readout device to perform a printing process. As illustrated in FIG. 1, the ink jet printing apparatus 1 includes an image processing unit 10, a head drive control unit 20, an ink jet head unit 30, a conveyance unit 40, and a control unit 50.

The image processing unit 10 receives the image data which is output from the computer or the document readout device, and administers various processes on the image data. In the present embodiment, the image processing unit 10 corresponds to the first embodiment of the image processing apparatus of the present invention. The image processing unit 10 includes a CPU (Central Processing Unit), a semiconductor memory, and the like. The CPU and semiconductor memory of the image processing unit 10 may be shared with the control unit 50 to be described later, or may be provided as a separate component.

The image processing unit 10 executes an image processing program which is stored in advance in a storage medium such as a semiconductor memory or a hard disk, and operates an electric circuit to perform the processes of each of the units to be described later.

Figure 2:
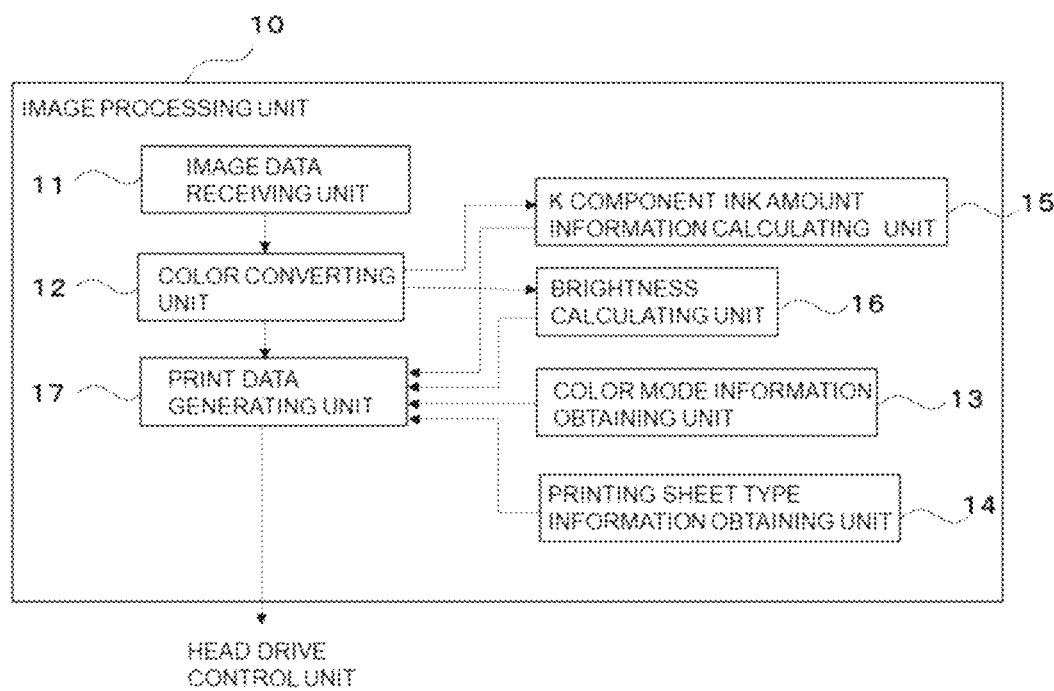
FIG. 2 is a block diagram that illustrates the configuration of the image processing apparatus of the image processing apparatus according to the first embodiment of the present invention.

As illustrated in FIG. 2, the image processing unit 10 is equipped with an image data receiving unit 11, a color converting unit 12, a color mode information obtaining unit 13, a printing sheet type information obtaining unit 14, a K component ink amount information calculating unit 15, and a brightness calculating unit 16, and a print data generating unit 17.

The image data receiving unit 11 receives image data which is output from the computer or the document readout device in RGB format, and outputs the image data to the color converting unit 12.

The color converting unit 12 converts the image data in RGB format into image data in CMYK format.

The color mode information obtaining unit 13 acquires color mode information that indicates whether color printing or monochrome printing is to be performed, based on the image data. The color mode information may be acquired as information which is set for a print job that includes the image data output from the computer, or may be acquired as information which is set and input by the user on an operation panel (not shown) provided on the ink jet printing apparatus 1. Alternatively, the color mode information may be automatically recognized and acquired based on the color components which are included in the image data in CMYK format.

The printing sheet type information obtaining unit 14 acquires information on the type of printing sheet on which a printing process based on the image data is administered. In the present embodiment, information regarding a plurality of types of printing sheets having different degrees of ink bleeding is acquired. Specifically, information regarding plain paper and information regarding matte paper are acquired, for example. Between plain paper and matte paper, plain paper has a greater degree of ink bleeding than matte paper. That is, matte paper is a printing sheet which has a degree of ink bleeding less than or equal to a threshold value, and plain paper is a printing sheet which has a degree of ink bleeding greater than the threshold value. Note that in the present embodiment, information regarding matte paper and plain paper is acquired, but the present invention is not limited to such a configuration, and information regarding printing sheets other than matte paper maybe acquired as a type of printing sheet which has a degree of ink bleeding less than or equal to the threshold value. In addition, information regarding printing sheets other than plain paper may be acquired as a type of printing sheet which has a degree of ink bleeding greater than the threshold value.

The K component ink amount information calculating unit 15 calculates ink amount information of the K component based on the image data of the K component in the image data in CMYK format. In the present embodiment, the sum of all of the pixel values that constitute the image data of the K component is calculated as the ink amount information of the K component.

The brightness calculating unit 16 calculates the brightness of color components other than the K component based on the image data of the C component, the M component, and the Y component in the image data in CMYK format. The brightness calculating unit 16 of the present embodiment administers Lab conversion on the C component, the M component, and the Y component of each pixel that constitutes the image data, and calculates the L value thereof, for example. Then, the brightness calculating unit 16 calculates the average value of the L values of each pixel as the brightness.

The print data generating unit 17 generates print data for ink jet printing based on the image data in CMYK format, and also administers a density fluctuation suppressing process that suppresses density fluctuations in a printed image. Specifically, the print data generating unit 17 of the present embodiment administers a halftone process on the image data of each of the C component, the M component, the Y component, and the K component, thereby generating ink drop data for each color as print data. A dither mask process that employs a dither method may be administered as the halftone process, for example. However, the present invention is not limited to such a configuration, and the halftone process that employs an error dispersing method may be administered. The ink drop data is data that defines the number of ink drops which are ejected from a single nozzle of the ink jet head in order to form one dot of the printed image.

In addition, the print data generating unit 17 of the present embodiment performs a density fluctuation suppressing process for suppressing density fluctuations of a printed image when performing a halftone process. The density fluctuation suppressing process of the present embodiment is a process that suppresses the aforementioned wind ripple fluctuations.

The print data generating unit 17 of the present embodiment is capable of switching among a plurality of types of density fluctuation suppressing processes having different degrees of suppression of wind ripple fluctuations, and switches among the processes based on the aforementioned color mode information and printing sheet type information. Specifically, the print data generating unit 17 of the present embodiment switches among three types of density fluctuation suppressing processes having different degrees of suppression of wind ripple fluctuations, and a process of performing only a normal halftone process without performing a density fluctuation suppressing process. In the present embodiment, a density fluctuation suppressing process having the highest degree of suppression of wind ripple fluctuations is designated as a first density fluctuation suppressing process, a density fluctuation suppressing process having the second highest degree of suppressing wind ripple fluctuations is designated as a second density fluctuation suppressing process, and a density fluctuation suppressing process having the smallest degree of suppressing wind ripple fluctuations is designated as a third density fluctuation suppressing process.

The print data generating unit 17 of the present embodiment switches the density fluctuation suppressing process according to the combination of the color mode information (color printing or monochrome printing) and the printing sheet type information (plain paper or matte paper).

Here, the reason for switching the density fluctuation suppressing process according to the combination of the color mode information (color printing or monochrome printing) and the printing sheet type information (plain paper or matte paper) will be described. First, Table 1 below shows the evaluation results of wind ripple fluctuations corresponding to each combination when only a normal halftone process is performed without performing the density fluctuation suppressing process. An evaluation result of "A" of wind ripple fluctuations shown in Table 1 below means that the wind ripple fluctuations is not significantly noticeable, an evaluation result of "B" means that the wind ripple fluctuations is not so significantly noticeable, and an evaluation result of "C" means that the wind ripple fluctuations is significantly noticeable. That is, the wind ripple fluctuations are not significantly noticeable in the order of evaluation results A, B, and C.

TABLE 1

| Printing Sheet Type | Color Mode | Process | Wind Ripple Fluctuations |
| --- | --- | --- | --- |
| Plain Paper | Color | Normal Halftone Process | A |
| | Monochrome | Normal Halftone Process | A |

TABLE 1-continued

| Printing Sheet Type | Color Mode | Process | Wind Ripple Fluctuations |
| --- | --- | --- | --- |
| Matte Paper | Color | Normal Halftone Process | B |
| | Monochrome | Normal Halftone Process | C |

As shown in Table 1, in the case that the type of printing sheet is plain paper, the degree of bleeding thereof is large. Therefore, the wind ripple fluctuations that appear as streaks due to deviations in ink landing positions is not significantly noticeable, and the evaluation result is "A". Meanwhile, in the case that the type of printing sheet is matte paper, the degree of bleeding thereof is smaller than that of plain paper. Therefore, wind ripple fluctuations are more significantly noticeable than on plain paper. In particular, monochrome printing has a larger difference in shades than color printing, so wind ripple fluctuations are more significantly noticeable. Therefore, the evaluation results of the wind ripple fluctuations are "B" in the case of matte paper and color printing, and "C" in the case of matte paper and monochrome printing.

In contrast, in any of the combinations which are shown in Table 1, if the aforementioned first density fluctuation suppressing process is performed, the wind ripple fluctuations become less significantly noticeable. However, in this case, the first density fluctuation suppressing process requires data processing time, and therefore the print processing speed is reduced. Particularly in the case of matte paper, high resolution printing is often performed, and therefore a required print processing speed is slow. However, but in the case of plain paper, printing is not performed at a resolution as high as that for matte paper, so a required printing is fast.

Table 2 shows the evaluation results of the degree of achievement of required print processing speeds in cases in which the first density fluctuation suppressing process is performed for each combination of paper types and color modes. An evaluation result of "A" of the print processing speed shown in Table 2 below means that a required print processing speed can be sufficiently achieved, an evaluation result "B" means that a required print processing speed can be achieved, and an evaluation result "C" means that a required print processing speed cannot be sufficiently achieved.

TABLE 2

| Printing Sheet Type | Color Mode | Process | Wind Ripple Fluctuations | Print Processing Speed |
| --- | --- | --- | --- | --- |
| Plain Paper | Color | First Density Fluctuation Suppressing Process | A | C |
| | Monochrome | First Density Fluctuation Suppressing Process | A | C |
| Matte Paper | Color | First Density Fluctuation Suppressing Process | A | B |
| | Monochrome | First Density Fluctuation Suppressing Process | A | A |

As shown in Table 2, in the case that the type of printing sheet is plain paper, the required print processing speed is higher than that of matte paper. Therefore, the evaluation result is "C". In contrast, in the case that the type of printing sheet is matte paper, the required print processing speed is slower than that of plain paper. Therefore, the evaluation result is "B" or "A". When comparing color printing and monochrome printing, the processing time of the first density fluctuation suppressing process is longer in color printing. Therefore, the evaluation result for color printing is "B", and the evaluation result is "A" in the case of monochrome printing.

From the evaluation results of Tables 1 and 2, in the present embodiment, the density fluctuation suppressing process is switched as shown in Table 3 such that the evaluation results of both the wind ripple fluctuations and the print processing speed become "A".

TABLE 3

| Printing Sheet Type | Color Mode | Process | Wind Ripple Fluctuations | Print Processing Speed |
|---|---|---|---|---|
| Plain Paper | Color | Normal Halftone Process | A | A |
|  | Monochrome | Normal Halftone Process | A | A |
| Matte Paper | Color | Second or Third Density Fluctuation Suppressing Process | A | A |
|  | Monochrome | First Density Fluctuation Suppressing Process | A | A |

As shown in Table 3, in the case that the printing sheet type information is plain paper, wind ripple fluctuations are not significantly noticeable regardless of the color mode information. Therefore, the print data generating unit 17 only performs a normal halftone process, without performing a density fluctuation suppressing process. As a result, the data processing speed can be increased, and a required print processing speed can be sufficiently achieved.

In contrast, in the case that the printing sheet type information is matte paper and the color mode information is monochrome printing, the print data generating unit 17 performs the first density fluctuation suppressing process because the wind ripple fluctuations is most significantly noticeable in this case.

In addition, in the case that the printing sheet type information is matte paper and the color mode information is color printing, the print data generating unit 17 performs the second density fluctuation suppressing process or the third density fluctuation suppressing process, according to the ink amount information of the K component and the brightness of the color components other than the K component.

Note that the contents of the first through third density fluctuation suppressing processes, and the switching between the second density fluctuation suppressing process and the third density fluctuation suppressing process, will be described in detail later.

In addition, the image processing unit 10 is not limited to performing the aforementioned processes. The image processing unit 10 may also perform various other known image processes, such as a gamma correcting process and an edge enhancing process.

The head drive control unit 20 drives the ink jet head unit 30 to eject ink from each nozzle of an ink jet head for each color, based on the ink drop data of each color which is generated by the print data generating unit 17.

The ink jet head unit 30 includes a plurality of ink jet heads that eject inks of each color of C, M, Y, and K. As described above, each ink jet head is controlled by the head drive control unit 20 based on the ink drop data of each color, in order to eject ink onto a print medium and form an image on the print medium.

The conveyance unit 40 includes a conveyance mechanism that conveys the print medium to the ink jet head unit 30.

The control unit 50 includes a CPU (Central Processing Unit), a semiconductor memory, etc., and controls the entirety of the ink jet printing apparatus 1. The control unit 50 controls the operation of each component of the ink jet printing apparatus 1 by executing a control program, which is stored in advance in a storage medium such as a semiconductor memory or a hard disk, and operating an electric circuit.

Figure 3:
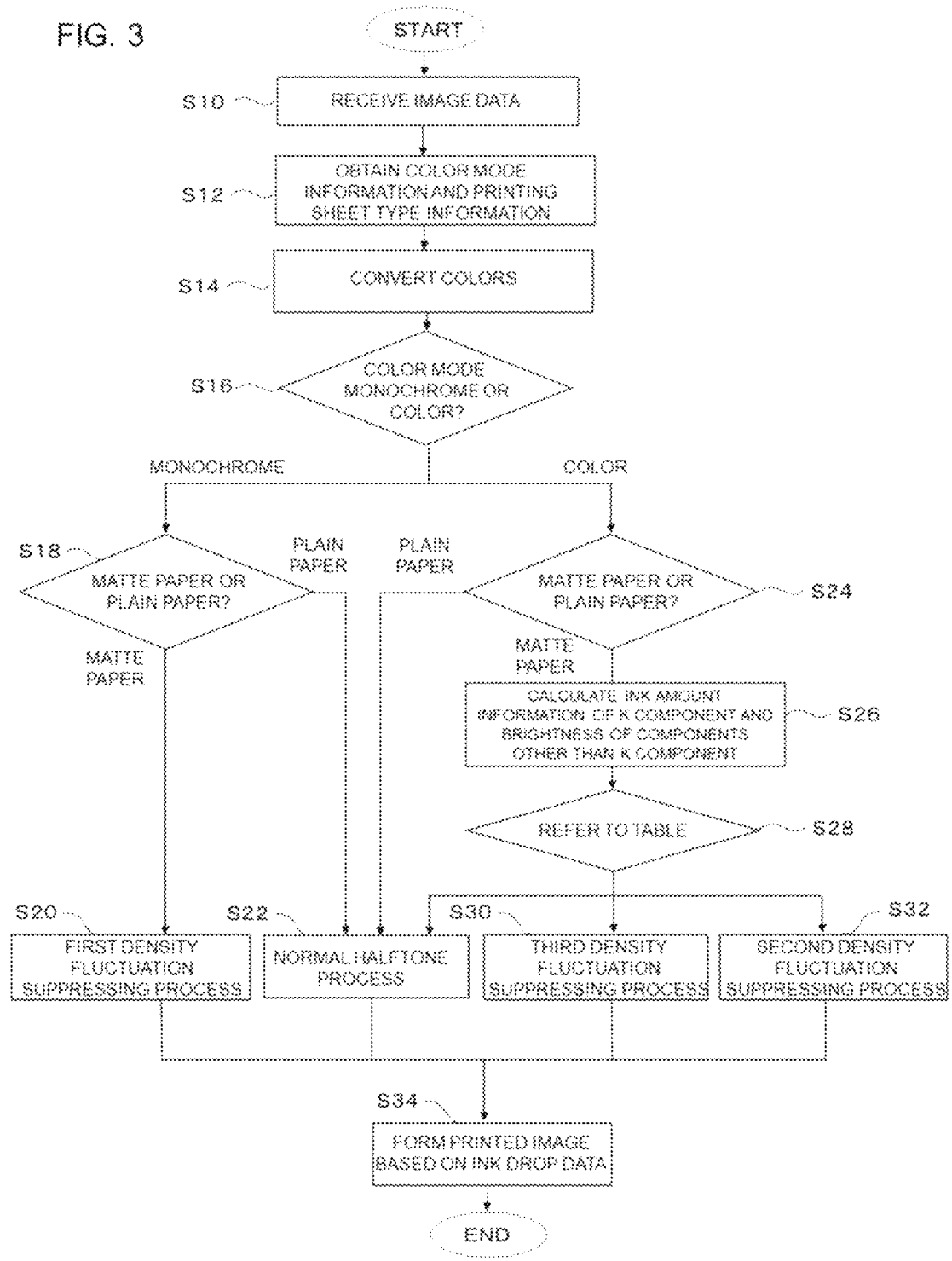
FIG. 3 is a flow chart that illustrates the processes which are performed by the ink jet printing apparatus employs the image processing apparatus according to the first embodiment of the present invention.

Next, the flow of processes of the ink jet printing apparatus 1 of the present embodiment will be described with reference to the flowchart illustrated in FIG. 3. Note that here, switching among the first through third density fluctuation suppressing processes will be mainly described.

First, a print job which is output from a computer, etc. is input to the ink jet printing apparatus 1, and the image data receiving unit 11 receives image data in RGB format which is included in the print job (S10).

In addition, the color mode information which is set in the print job is acquired by the color mode information obtaining unit 13, and the printing sheet type information which is also set in the print job is acquired by the printing sheet type information obtaining unit 14 (S12).

Then, the image data in RGB format which is received by the image data receiving unit 11 is input to the color converting unit 12 and is converted into image data in CMYK format (S14).

Next, the print data generating unit 17 performs halftone process on the input CMYK format image data to generate ink drop data for each color. At this time, the density fluctuation suppressing process is switched, based on the color mode information and the printing sheet type information.

Specifically, the print data generating unit 17 determines whether the color mode information is color printing or monochrome printing (S16). In the case that the color mode information indicates monochrome printing (S16: monochrome), it is determined whether the printing sheet type information indicates plain paper or matte paper (S18). Then, in the case that the printing sheet type information indicates matte paper (S18: matte paper), the print data generating unit 17 performs halftone process that includes the first density fluctuation suppressing process on the image data in CMYK (S20), and ink drop data is generated for each color.

In contrast, in the case that the printing sheet type information indicates plain paper (S18: plain paper), the print data generating unit 17 does not perform a density fluctuation suppressing process, but performs normal halftone process on the image data in CMYK format (S22), and ink drop data is generated for each color.

In addition, in the case that the color mode information indicates color printing (S16: color), the print data generating unit 17 determines whether the printing sheet type information is plain paper or matte paper (S24). Then, in the case that the printing sheet type information is plain paper (S24: plain paper), the print data generating unit 17 does not perform the density fluctuation suppressing process, but performs a normal halftone process on the image data in CMYK format (S22), and ink drop data is generated for each color.

In contrast, in the case that the print data generating unit 17 determines that the printing sheet type information is matte paper (S24: matte paper), the K component ink amount information calculating unit 15 calculates ink amount information for the K component, based on the image data of the K component within the image data in CMYK format (S26). In addition, the brightness calculating unit 16 calculates the brightness of the color components other than the K component, based on the image data of the C component, the M component, and the Y component within the image data in CMYK format (S26).

Then, the print data generating unit 17 refers to a table which is set in advance, based on the ink amount information of the K component and the brightness of the components other than the K component (S28), and switches the density fluctuation suppressing process. Table 4 below shows an example of the aforementioned table.

TABLE 4

| Ink Amount Information of K Component | Brightness of Components other than K Component | Contents of Processing |
|---|---|---|
| 80~100 | 0~100 | Normal Halftone Process |
| 40~80 | 0~50 | Normal Halftone Process |
| 40~80 | 50~80 | Third Density Fluctuation Suppressing Process |
| 40~80 | 80~100 | Second Density Fluctuation Suppressing Process |

As shown in Table 4, the print data generating unit 17 does not perform a density fluctuation suppressing process in the case that the ink amount information of the K component is within a range from 80 to 100, for example, but administers a normal halftone process on the image data in CMYK format (S22), and generates ink drop data for each color. In this case, because the ink amount information of the K component is large, the degree of bleeding will be large even if printing is to be administered onto matte paper and the wind ripple fluctuations will not be significantly noticeable. Therefore, a density fluctuation suppressing process is not performed regardless of the brightness level (0 to 100).

In addition, the print data generating unit 17 does not perform a density fluctuation suppressing process also in the case that the ink amount information of the K component is within a range from 40 to 80 and the brightness of components other than the K component is within a range from 0 to 50, for example. In such a case, a normal halftone process is administered (S22) and ink drop data is generated for each color. In this case, the ink amount information of the K component is small, but the brightness of the components other than the K component is low. That is, in the case that the brightness of the components other than the K component is low, the amount of ink of the color components other than the K component tends to be large. Therefore, the degree of ink bleeding tends to be large and the density differences tend to be small. As a result, wind ripple fluctuations will not be significantly noticeable. Therefore, in this case, a density fluctuation suppressing process is not performed.

In addition, in the case that the ink amount information of the K component is within a range from 40 to 80 and the brightness of the components other than the K component is within a range from 50 to 80, for example, the print data generating unit 17 performs halftone process that includes the third density fluctuation suppressing process (S30), and generates ink drop data for each color. In this case, the ink amount information of the K component is small, and the brightness of the components other than the K component is somewhat high. That is, in the case that the brightness of the components other than the K component is somewhat high, the amount of ink of the color component other than the K component tends to be small, and the degree of ink bleeding is not excessively large. As a result, wind ripple fluctuations will be somewhat noticeable. Therefore, in this case, a halftone process that includes the third density fluctuation suppressing process is performed.

In addition, in the case that the ink amount information of the K component is within a range from 40 to 80 and the brightness of the components other than the K component is within a range from 80 to 100, for example, the print data generating unit 17 performs a halftone process that includes the second density fluctuation suppressing process (S32), and generates ink drop data for each color. In this case, the ink amount information of the K component is small, and the brightness of the components other than the K component is high. That is, in the case that the brightness of the components other than the K component is high, the amount of ink of the color components other than the K component tends to be small, and the degree of ink bleeding is small. As a result, wind ripple fluctuations will be significantly noticeable. Therefore, in this case, a halftone process that includes the second density fluctuation suppressing process is performed.

Note that the density fluctuation suppressing processes that correspond to the combinations of the ink amount information and the brightness of the color components other than the K component shown in Table 4 are merely examples, and the present invention is not limited to such a configuration. Essentially, wind ripple fluctuations tend to become more noticeable as the ink amount information becomes smaller, and wind ripple fluctuations also tend to become more noticeable as the brightness of color components other than K component becomes greater. Therefore, it is preferable for a density fluctuation suppressing process that exhibits a greater degree of fluctuation suppression the smaller the ink amount information and the greater the brightness of the color components other than K component.

By switching among the density fluctuation suppressing processes according to the combination of the ink amount information of the K component and the brightness of the color components other than the K component in this manner, the density fluctuation suppressing process can be switched according to the degree of ink bleeding. Thereby, it is possible to suppress wind ripple fluctuations more appropriately.

The ink drop data for each color which is generated by performing the predetermined halftone process as described above is output from the print data generating unit 17 to the head drive control unit 20.

The head drive control unit 20 drives the ink jet head unit 30 based on the input ink drop data for each color, to eject ink from each nozzle of the ink jet head for each color, to form a printed image (S34).

According to the ink jet printing apparatus 1 of the present embodiment, the color mode information that indicates whether color printing or monochrome printing is to be performed is acquired, information regarding the type of the printing sheet is acquired, and the density fluctuation suppressing process to be administered is switched based on the acquired color mode information and printing sheet type information. Therefore, it is possible to achieve a required print processing speed while suppressing wind ripple fluctuations and maintaining image quality.

In addition, according to the ink jet printing apparatus 1 of the present embodiment, in the case that information that indicates that the printing sheet has a degree of bleeding which is less than or equal to the threshold value is received as the printing sheet type information, a density fluctuation suppressing process is performed. Therefore, the density fluctuation suppressing process can be switched depending on the degree of ink bleeding that influences the occurrence of wind ripple fluctuations.

Note that as described above, the present embodiment determines whether color printing or monochrome printing is to be performed based on the color mode information, and the density fluctuation suppressing process is switched according to the result of the determination. However, in the case that the image data only includes a single color, processes are performed in the same manner as that for monochrome printing. In the case that the image data only includes a single color, the amount of ink is smaller when compared to that of full-color color printing, in a manner similar to monochrome printing, and the manner in which wind ripple fluctuations occur is similar to that of monochrome printing.

Next, the normal halftone process which is performed by the print data generating unit 17 of the present embodiment and the halftone processes that include the first through third density fluctuation suppressing processes will be described.

First, the normal halftone process will be described. Because the normal halftone process of the present embodiment is the same as an existing halftone process, a detailed description thereof will be omitted. However, the concept will be described with reference to FIG. 4. Note that here, a case in which the maximum number of drops of ink ejected for each pixel is 3 drops is described. However, the actual maximum number of drops is 5 drops, 7 drops, etc. In addition, the existing halftone process which will be described here is a halftone process that employs a dither method, and is a halftone process that employs a 4×4 dither matrix.

Figure 4:
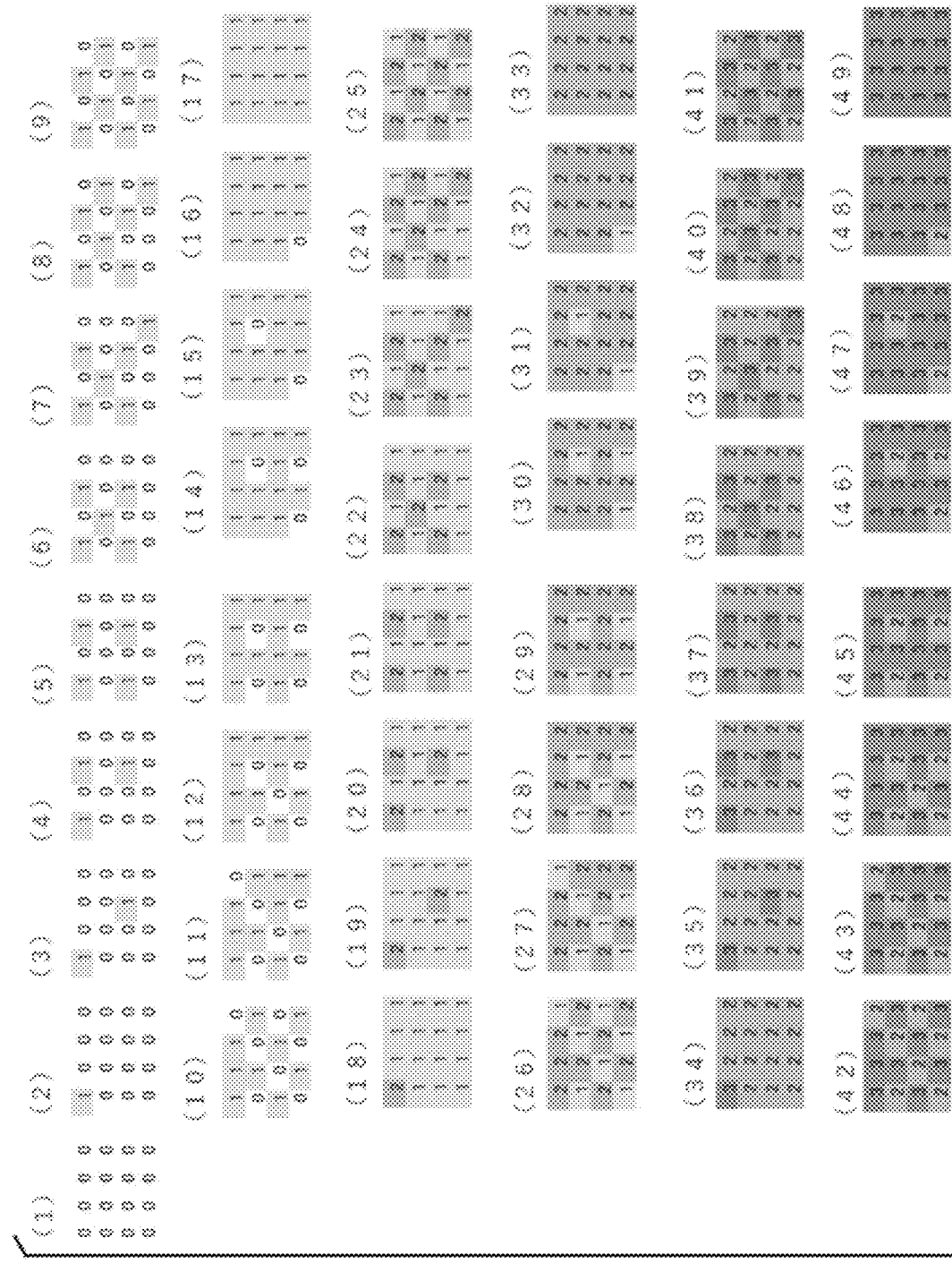
FIG. 4 is a collection of diagrams for explaining the concept of a normal halftone process.

(1) of FIG. 4 through (49) of FIG. 4 are diagrams that illustrate the result of performing halftone process on predetermined 4×4 pixels within image data, for a case in which the print density is from a lowest density (zero) to a maximum density. As the number in parentheses increases, the print density increases by one stage. Each of the squares in (1) of FIG. 4 through (49) of FIG. 4 represents one pixel.

(1) of FIG. 4 through (17) of FIG. 4 show the results of the halftone process in the case that the print density changes from zero to a 17th stage. As illustrated in (1) of FIG. 4 through (17) of FIG. 4, in the case that the print density changes from zero to the 17th stage, each time that the print density increases by one stage, data "1" that indicates that the number of ink drops "1" is added one by one according to the distribution of each dither threshold value in the dither matrix. Then, when the print density is at the 17th stage, all of the pixels become data "1".

Next, as illustrated in (18) of FIG. 4 through (33) of FIG. 4, in the case that the print density is from an 18th stage through a 33rd stage, each time that the print density is increased by one stage from the state in which all of the pixels are data "1", data "2" that indicates that the number of ink drops is "2" is added one by one according to the distribution of each dither threshold value in the dither matrix. Then, when the print density is at the 33rd stage, all of the pixels become data "2".

Next, as illustrated in (34) of FIG. 4 through (49) of FIG. 4, in the case that the print density is from a 34th stage through a 49th stage, each time that the print density is increased by one stage from the state in which all of the pixels are data "2", data "3" that indicates that the number of ink drops is "3" is added one by one according to the distribution of each dither threshold value in the dither matrix. Then, when the print density is at the 49th stage, all of the pixels become data "3". That is, all of the pixels will be at a maximum value (maximum number of drops).

As described above, in the case of the existing halftone process, all of the pixels become non-zero data when the print density is at the 17th stage, and the data "2" or "3" is sequentially added after the print density is at the 18th stage. That is, after the print density is at the 17th stage or beyond, a zero value is not included among the pixels. Therefore, the print dot density is constantly in a high state, and the aforementioned airflow that accompanies the ejected ink is likely to be generated. Therefore, there is no effect of suppressing wind ripple fluctuations. However, as compared with the halftone processes that include the first through third density fluctuation suppressing process described later, the calculation processing speed is high because the calculation is simple.

With respect to data "4" for 4 or more drops, this data is added each time that the print density is increased by one stage in the same manner as that described above.

The above is the explanation of the normal halftone process that employs the dither matrix.

Next, a halftone process that includes the third density fluctuation suppressing process will be described.

As described earlier, the third density fluctuation suppressing process is the density fluctuation suppressing process that exhibits the smallest degree of suppressing density fluctuations. In the present embodiment, the so called 1 dropless process is performed as the third density fluctuation suppressing process. The 1 dropless process is a process for preventing ink drop data from including data for 1 drop, which is the minimum number of drops. In the present embodiment, when the aforementioned normal halftone process is performed, the 1 dropless process is performed only on the ink drop data of the K component. The reasons why the 1 dropless processing is applied only to the ink drop data of the K component in this manner is that the K component influences wind ripple fluctuations the most, and that the data processing speed can be accelerated.

Figure 5:
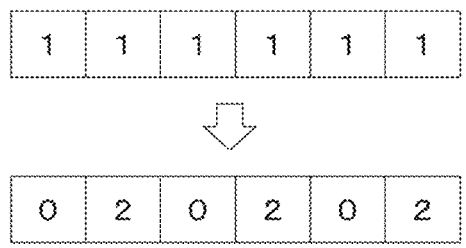
FIG. 5 is a diagram for explaining an example of a 1 drop less process.

As a method of the 1 dropless processing, 1 drop ink drop data may be deleted by simply setting the 1 drop ink drop data which is included in the ink drop data to "0", for example. However, the present invention is not limited to such a configuration, and in the case that the ink drop data of a predetermined pixel is ink drop data for 1 drop, the ink drop data of the one pixel may be converted to ink drop data "0" and "2" for two pixels, thereby deleting the 1 drop ink drop data as illustrated in FIG. 5, for example. Note that, each of the squares illustrated in FIG. 5 represents one pixel, and the numerical values in each of the squares represents the number of drops in the ink drop data.

By converting the ink drop data "1" into the ink drop data "0" and "2" for two pixels as described above, ink data for one drop, which has a small amount of ink droplets and is likely to cause landing deviations, can be deleted. Therefore, wind ripple fluctuations can be suppressed. In addition, substantially the same density can be maintained. Note that the method of 1 dropless processing is not limited to that described above, and other known methods may be employed.

The above is the explanation of the halftone process that includes the third density fluctuation suppressing process.

Next, a halftone process that includes the second density fluctuation suppressing process will be described.

As described earlier, the second density fluctuation suppressing process is the density fluctuation suppressing process in which the degree of suppressing density fluctuations is the second largest after the first density fluctuation suppressing process. In the present embodiment, the so called 2 dropless process is performed as the second density fluctuation suppressing process. The 2 dropless process is a process for preventing ink drop data from including data for 1 drop and for 2 drops. In the present embodiment, when the aforementioned normal halftone process is performed, the 2 dropless process is performed only on the ink drop data of the K component.

As a method of the 2 dropless processing, 1 drop and 2 drop ink drop data may be deleted by setting the 1 drop and 2 drop ink drop data which are included in the ink drop data to "0", for example. However, the present invention is not limited to such a configuration, and in the case that the ink drop data of a predetermined pixel is ink drop data for 1 drop, the 1 drop ink drop data may be deleted by converting the ink drop data of the one pixel to ink drop data "0" and "2" for two pixels, and further, the 2 drop ink data may be deleted by converting the ink drop data to "0" and "3" for two pixels.

By converting the ink drop data "1" and "2" into the ink drop data "0" and "3" for two pixels as described above, ink data for one drop and two drops, which have small amounts of ink droplets and are likely to cause landing deviations, can be deleted. Therefore, wind ripple fluctuations can be suppressed to a greater degree than the third density fluctuation suppressing process. In addition, substantially the same density can be maintained. Note that the method of 2 dropless processing is not limited to that described above, and other known methods may be employed.

The above is the explanation of the halftone process that includes the second density fluctuation suppressing process.

As described above, in the case that information that indicates color printing is received as the color mode information and matte paper is received as the printing sheet type information, the halftone process that includes the 1 dropless process or the 2 dropless process only for the K component is performed. Therefore, wind ripple fluctuations can be suppressed by a process which is simpler than a halftone process that includes the first density fluctuation suppressing processing to be described later, and the data processing speed can be accelerated. As a result, a required print processing speed can be sufficiently achieved.

Next, the halftone process that includes the first density fluctuation suppressing process will be described.

As described earlier, the first density fluctuation suppressing process is the density fluctuation suppressing process that exhibits the highest degree of suppression of density fluctuations. First, the concept of the halftone process that includes the first density fluctuation suppressing process will be described with reference to FIG. 6. Note that although a case in which the maximum number of drops of ink ejected onto each pixel is 3 drops will be described here as well, the actual maximum number of drops is 5 drops, 7 drops, etc. In addition, the halftone process that includes the first density fluctuation suppressing process to be described here is also a halftone process that employs a 4×4 dither matrix.

Figure 6:
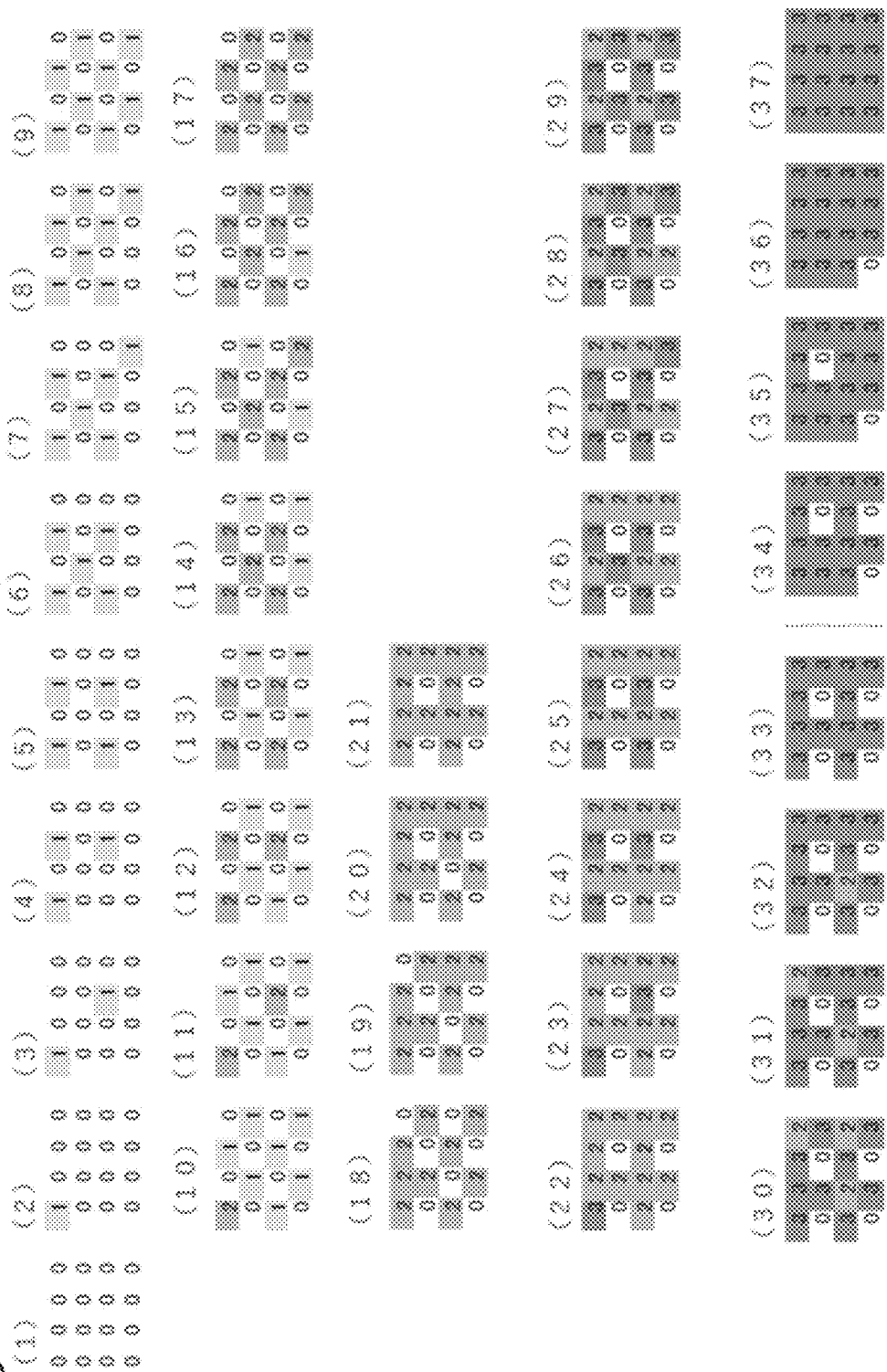
FIG. 6 is a collection of diagrams for explaining a halftone process that includes a first density fluctuation suppressing process.

(1) of FIG. 6 through (37) of FIG. 6 are diagrams that illustrate the results of performing a halftone process that includes a first density fluctuation suppressing process on predetermined 4×4 pixels within the image data. The results of the halftone process are shown for a case in which the print density changes from a minimum density (zero) to a maximum density. As the number in parentheses increases, the print density increases by one stage. Here, in order to facilitate understanding of the explanation, it is assumed that all of the 4×4 pixels have the same density.

In the halftone process that includes the first density fluctuation suppressing process, first, the number of ink drops "1" is sequentially added according to the increase in the print density. However, the addition of the data "1" is ceased in a state in which a zero value remains. That is, the addition of the data "1" is ceased when the number of pixels having a zero value reaches a predetermined number of pixels.

Next, as the print density increases, data "2" is sequentially added. At this time, the data "2" are arranged according to the same arrangement rule as that by which the data "1" are arranged. The addition of the data "2" is ceased in a state in which a zero value remains. Further, data "3" is sequentially added according to the increase in the print density. At this time, the data "3" are arranged according to the same arrangement rule as that by which the data "2" are arranged. A state in which a zero value remains is maintained until the print density reaches the maximum density, and all of the pixels reach the maximum value (data "3") at the time when the print density reaches the maximum density. Hereinafter, a more specific description will be given with reference to FIG. 6

(1) of FIG. 6 through (9) of FIG. 6 show the results of the halftone process in the case that the print density changes from zero to a ninth stage. As illustrated in (1) of FIG. 6 through (9) of FIG. 6, in the case that the print density changes from zero to the ninth stage, each time the density increases by one stage, data "1" that represents a number of ink drops "1" is added one by one according to the distribution of each dither threshold value in the dither matrix. Then, as described above, the addition of the data of "1" is ceased while a zero value is left. Here, the addition of the data "1" is ceased when the print density is at the 9th stage. The print density at which the addition of the data "1" is ceased is not limited to the 9th stage, but is set to a stage at which wind ripple fluctuations can be suppressed.

Next, as illustrated in (10) of FIG. 6 through (21) of FIG. 6, the data "1" or "0" is replaced with data "2" when the print density is from a 10th to a 21th stage.

First, as illustrated in (10) of FIG. 6 through (17) of FIG. 6, when the print density from the 10th to a 17th stage, data "2" are substituted for data "1", employing the same arrangement rule for the data "0" in the case that the print density changes from zero to the 9th stage, for example. Thereby, the data "1" can be replaced with the data "2" while maintaining the number of zero values which were present in the 9th stage. Accordingly, the effect of suppressing wind ripple fluctuations can be maintained, and the print density gradation can be smoothed, such that tone jump can be suppressed. Tone jump is a phenomenon in which the gradation of a portion which originally had a smooth gradation changes rapidly and appears as a striped pattern.

Next, as illustrated in (18) of FIG. 6 through (21) of FIG. 6, when the print density is from an 18th to a 21st stage, the data "0" is replaced with data "2" according to the distribution of each dither threshold value in the dither matrix. Then, in the halftone process that includes the first density fluctuation suppressing process, the addition of the data "2" is ceased with zero values remaining as described above. Here, the addition of data "2" is ceased when the print density is at the 21st stage. The print density at which the addition of the data "2" is ceased is not limited to 21 steps, but is set at a step at which wind ripple fluctuations can be suppressed.

The number of zero values at the time when the addition of the data "2" is ceased may be smaller than the number of zero values at the time when the addition of the data "1" is ceased. This is because the size of the ink droplets increases as the number of ink drops increases, and gaps between the ink dots on the printing surface will be small or overlap. Therefore, even if the landing positions of ink droplets shift due to the influence of the air flow, wind ripple fluctuations are not likely to occur.

By reducing the number of zero values at the point in time when the addition of the data "2" is ceased to be less than the number of zero values at the point in time when the addition of the data "1" is ceased, that is, by administering the halftone process such that the percentage of zero values decreases as the number of multiple value data increases, the print density gradation can be increased and the image quality of the printed image can be improved.

Next, as illustrated in (22) of FIG. 6 through (37) of FIG. 6, the data "2" or "0" is replaced with data "3" when the print density is from a 22nd stage through a 37th stage.

First, as illustrated in (22) of FIG. 6 through (33) of FIG. 6, data "3" is substituted for data "2" from a 22nd stage to a 33rd stage by employing the same arrangement rule as that for the data "2" in the case that the print density changed from the 10th stage to the 21st stage the from a state in which the data "2" at the 21st stage is maintained, for example. Thereby, it is possible to replace the data "2" with the data "3" while maintaining the number of zero values which were present at the 21st stage. Therefore, the effect of suppressing wind ripple fluctuations can be maintained and the print density gradation can be smoothed, such that tone jump can be suppressed.

Next, as illustrated in (34) of FIG. 6 through (37) of FIG. 6, when the print density is from a 34th stage to a 37th stage, data "0" is substituted for the data "3" according to the distribution of each dither threshold value in the dither matrix. Then, a state in which zero values remain is maintained until the print density reaches the maximum density, at which point all of the pixels reach the maximum value (data "3") at the point in time when the print density reaches the maximum density.

As illustrated in (1) of FIG. 6 through (37) of FIG. 6, when the print data generating unit 17 of the present embodiment performs the halftone process that includes the first density fluctuation suppressing process, the halftone process is administered such that a zero value is always included, excluding the case in which all of the pixels that constitute the image data are converted to a maximum value (the case of (37) of FIG. 6). Thereby, a state in which the print dot density can be set to be lower than that of the existing halftone process can be achieved. Therefore, the generation of the aforementioned airflow that accompanies the droplets due to the ink being ejected can be suppressed, and wind ripple fluctuations can be suppressed. It was experimentally confirmed that the halftone process that includes the first density fluctuation suppressing process exhibits more effectiveness at suppressing wind ripple fluctuations than the halftone process that includes the 1 dropless process and the halftone process that includes the 2 dropless process.

In addition, as illustrated in (1) of FIG. 6 through (9) of FIG. 6, when the data "0" is converted into the data "1", it is preferable for the pixel of the data "0" to be arranged adjacent to the pixel of the data "1", without the pixels of the data "1" being continuous for two or more pixels in the vertical and horizontal directions. However, the arrangement of the "0" data and the "1" data depends on the density of each pixel within the image data. Therefore, after converting each pixel of the image data into data "0" and "1" using a dither matrix by the halftone process, portions at which the data "1" is continuous for two or more pixels in the vertical direction or the horizontal direction are detected, and a process to convert the data "1" to data "0" at the detected portions may be performed such that pixels of the data "1" are not continuous for two or more pixels in the vertical and horizontal directions, for example. Thereby, it is possible to maintain a state in which the print dot density is low, without depending on the image data.

Figure 7:
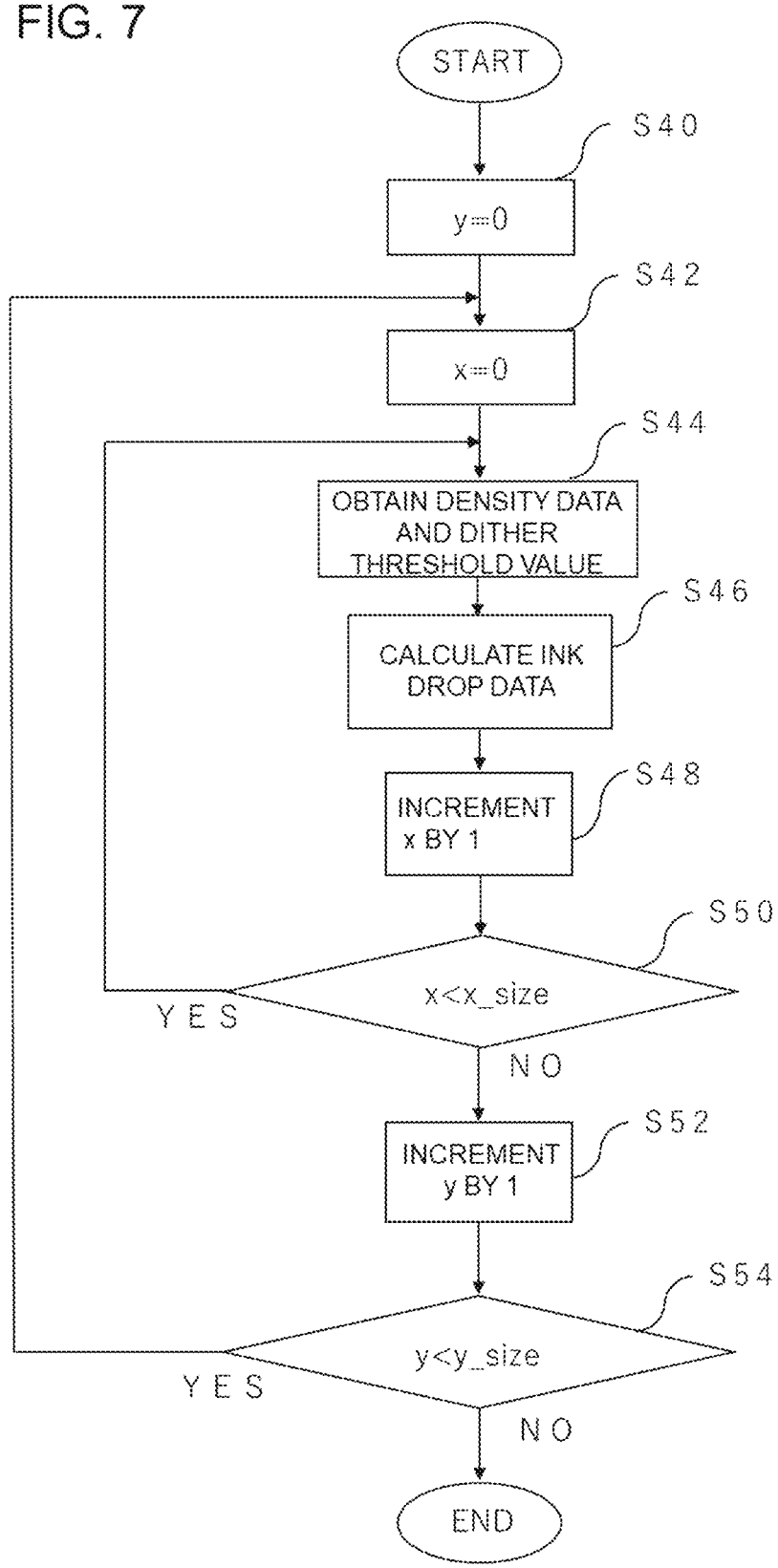
FIG. 7 is a diagram for schematically explaining a calculating process of the halftone process that includes the first density fluctuation suppressing process.

Next, an outline of the calculating process of the halftone process that includes the first density fluctuation suppressing process will be described with reference to the flowchart illustrated in FIG. 7. The process of the flowchart illustrated in FIG. 7 is the same as the aforementioned normal halftone process except for the specific calculation process of the ink drop data in S46.

First, the print data generating unit 17 sets the y coordinate of the pixels that constitute the image data to y=0 (S40) and the x coordinate to x=0 (S42). Note that the initial values of the x coordinate and y coordinate of the pixels that constitute the image data are zero.

Then, the density data [x] [y] of the pixels at the x coordinate and y coordinate positions which are set in S40 and S42 and a dither threshold value dth of a dither matrix Dth that corresponds to the x coordinate and y coordinate positions are acquired. (S44). The position of the dither threshold value dth in the dither matrix Dth is the remainder obtained by dividing the x coordinate of data [x] [y] by the size of the dither matrix Dth in the x direction and the remainder obtained by dividing the y coordinate of data [x] [y] by the size of the dither matrix in the y direction, for example. Note that the dither matrix Dth and the dither threshold value dth will be described in detail later.

Then, the print data generating unit 17 executes a calculating process employing the density data [x] [y] which is obtained in S44 and the dither threshold value dth, thereby calculating ink drop data that corresponds to the density data [x] [y] (S46). The specific calculating process which is executed here will be described in detail later.

Next, the print data generating unit 17 increments the x coordinate by 1 (S48), and in the case that the value of x is less than the size of the image data in the x direction (x_size) (S50: YES), the processes of S44 through S48 are repeated.

Then, in S50, the print data generating unit 17 increments the y coordinate by 1 (S52) in the case that x≥x_size (S50: NO). In the case that the value of y is less than the size of the image data in the y direction (S54: YES), the processes of S42 to S52 are repeated.

Then, the print data generating unit 17 ends the process at a point in time at which y≥y_size in S54 (S54, NO). Thereby, ink drop data can be obtained for all of the pixels that constitute the image data.

Next, the calculating process of S46 in FIG. 7 in the halftone process that includes the first density fluctuation suppressing process will be described in detail. Here, the density data of each pixel of the image data is set to be within a range from 0 to 255, and is converted into ink drop data within a range from 0 to 3 by performing a halftone process, as illustrated in FIG. 6.

Figure 8:
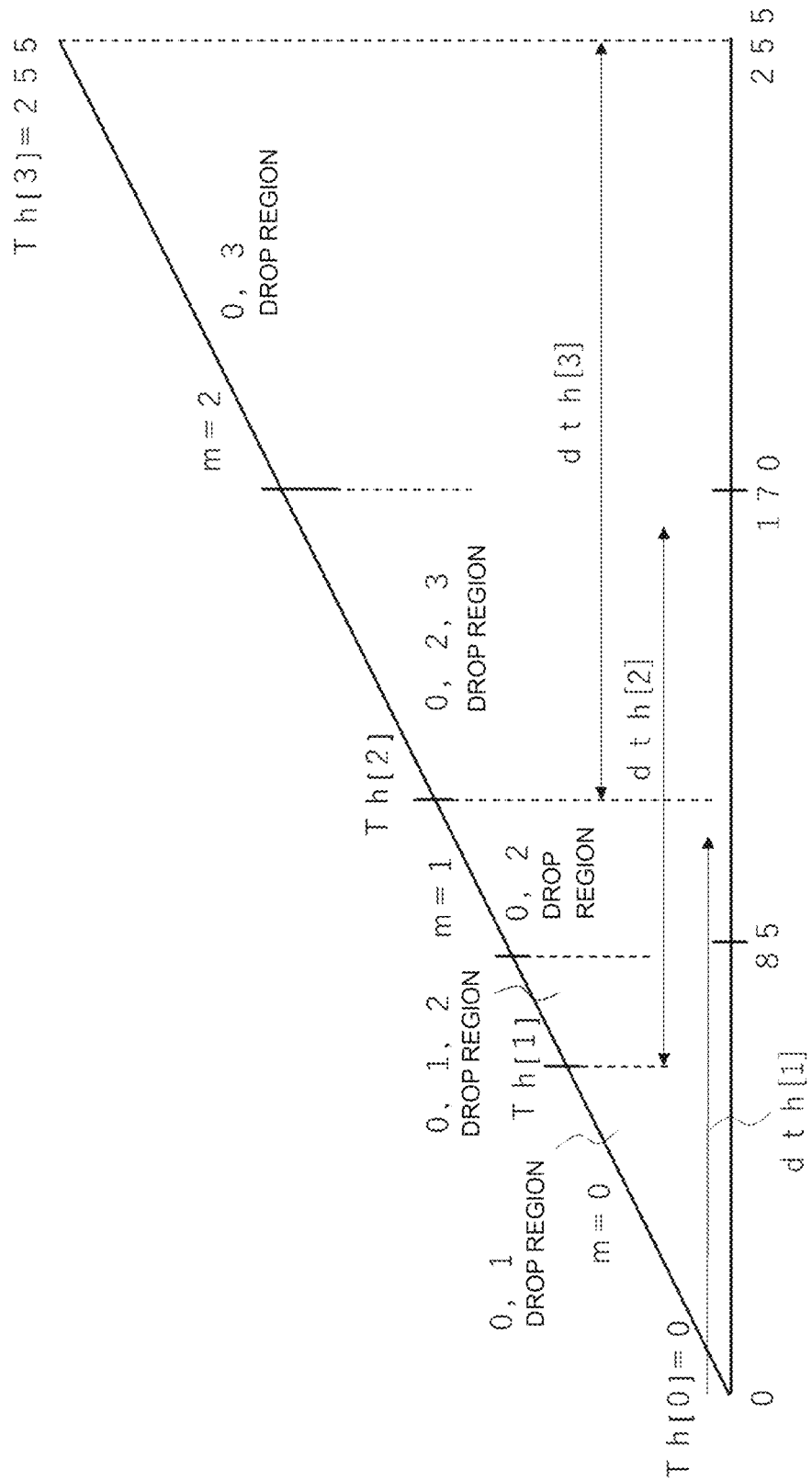
FIG. 8 is a diagram for explaining the calculating process of the halftone process that includes the first density fluctuation suppressing process in detail.

First, a density threshold value Th and the dither matrix Dth which are employed in the halftone process that includes the first density fluctuation suppressing process will be described. In the present embodiment, the density range of 0 to 255 is divided into three ranges, as illustrated in FIG. 8. The boundary values of the division are designated as density threshold values Th [0], Th [1], Th [2], and Th [3]. Th [0]=0, and Th [3]=255. Th [1] is a value for determining a print density range to which the data "1" is added by the halftone process, and is a value for determining the print density range from 0 through the 9th stage as illustrated in FIG. 6. That is, Th [1] is a print density at which the addition of the data "1" is ceased. Th [1] is set to be 30, for example. In the case that Th [1] is increased, the density of the data "1" becomes high, that is, the print dot density becomes high and wind ripple fluctuations occur. In the case that Th [1] is decreased, wind ripple fluctuations do not occur. However, because the number of small dots is reduced and graininess is increased, Th [1] is set to a value at which the wind ripple fluctuations and the graininess are balanced well by experimentation, etc.

Th [2] is a value for determining a print density range to which the data "2" is added by the halftone process, and is a value for determining the print density range from the 10th stage through the 21st stage as illustrated in FIG. 6. That is, Th [2] is a print density at which the addition of the data "2" is ceased. Th [2] is set to be 110, for example. Similar to Th [1], Th [2] is also set to a value at which wind ripple fluctuations and graininess are balanced well by experimentation, etc.

Then, in the present embodiment, the range from Th [0] to Th [1] is set as a density range index m=0, the range from Th [1] to Th [2] is set as a density range index m=1, and the range from Th [2] to Th [ 3] is set as a density range index m=2. The density range indices m=0 to 2 will be utilized later in a detailed description of the calculating process.

Next, in the present embodiment, a halftone process is performed employing three dither matrices Dth [1], Dth [2], and Dth [3] according to the three density ranges of the image data. The dither matrix Dth [1] is a dither matrix that converts image data in a first density range of from 0 to 105 into data "0" or "1" by the halftone process. The dither matrix Dth [1] is obtained by normalizing a dither matrix which is constituted by a blue noise mask with density values within the first density range of from 0 to 105. For example, when a threshold value of the dither matrix which is constituted by the blue noise mask is dth and a corresponding threshold value of the dither matrix Dth [1] is dth [1], dth [1] is calculated by the equation below. In the present embodiment, a dither matrix composed of a blue noise mask is employed. However, a halftone dot type dither matrix may be used as well.

dth [1]=(first normalized value×dth)/256

In addition, the first normalized value in the above equation is a value that controls the speed at which dots become dense. For example, if the first normalized value is 256, in the case that dth is 10, 100, dth [1] will be 10, 100. However, if the first normalized value is 128, dth [1] is 5, 50, resulting in the threshold value becoming smaller and printing becoming facilitated. That is, this means that the smaller the first normalized value, the faster the speed at which the dots become dense. In the present embodiment, 105 is set as the first normalized value.

The dither matrix Dth [2] is a dither matrix that converts image data in the second density range of from 30 to 135 into data "2" by the halftone process. The dither matrix Dth [2] is obtained by normalizing the dither matrix which is constituted by a blue noise mask with density values within the second density range of from 30 to 135. For example, when a threshold value of the dither matrix which is constituted by the blue noise mask is dth and a corresponding threshold value of the dither matrix Dth [2] is dth [2], dth [2] is calculated by the equation below. The second normalized value has the same meaning as that of the first normalized value, and in the present embodiment, 105 is set as the second normalized value.

dth [2]=(second normalized value×dth)/256

The dither matrix Dth [3] is a dither matrix that converts image data in the third density range of from 105 to 255 into data "3" by a halftone process. The dither matrix Dth [3] is obtained by normalizing the dither matrix which is constituted by a blue noise mask with density values within the third density range of from 105 to 255. For example, when a threshold value of the dither matrix which is constituted by the blue noise mask is dth and a corresponding threshold value of the dither matrix Dth [3] is dth [3], dth [3] is calculated by the equation below. The third normalized value has the same meaning as that of the first normalized value, and in the present embodiment, 255-Th [2] is set as the third normalized value. By setting such a value, when the density data is 255, solidly filled data of ink drops for "3" ink drop data is generated.

dth [3]=(third normalized value×dth)/256

In addition, FIG. 8 illustrates a region which is converted into ink drop data "0" and "1" (0, 1 drop region), a region which is converted into ink drop data "0", "1", and "2" (0, 1, 2 drop region), a region which is converted to ink drop data "0" and "2" (0, 2 drop region), a region which is converted into drop data "0", "2", and "3" (0, 2, 3 drop region), and a region which is converted into ink drop data "0" and "3" (0, 3 drop region).

Figure 9:
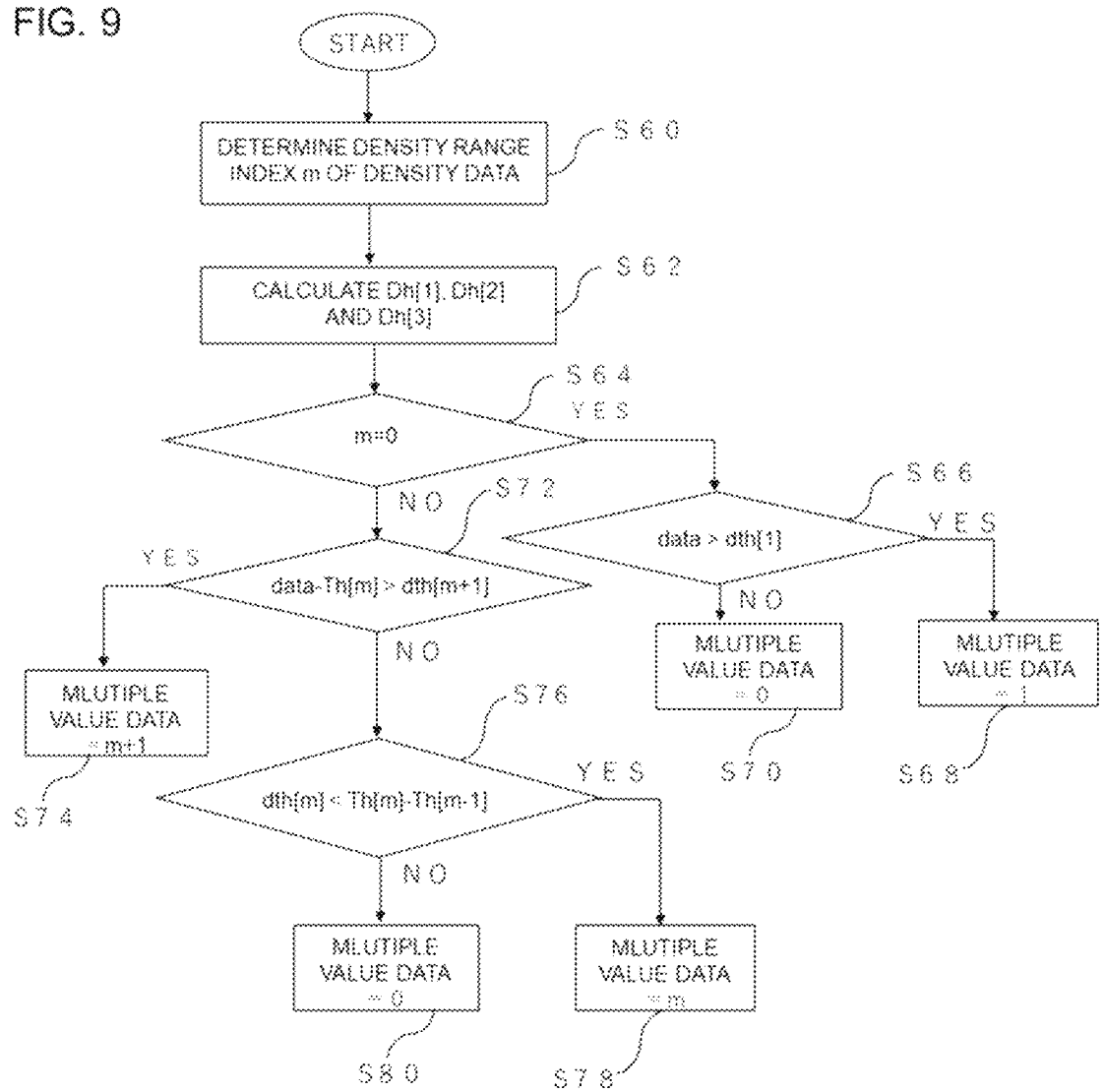
FIG. 9 is a flow chart for explaining the calculating process of the halftone process that includes the first density fluctuation suppressing process in detail.

Next, the halftone process that employs the aforementioned density threshold values Th [0] through Th [3] and the dither matrices Dth [1] through [3] will be described with reference to the flowchart illustrated in FIG. 9.

First, the print data generating unit 17 acquires density data (data) of a predetermined pixel that constitutes the image data, and determines which of the aforementioned density range indices m=0 through 2 the density data belongs to (S60). Specifically, a value of m that satisfies Th [m]≤data<Th [m+1] is determined.

Next, the print data generating unit 17 calculates the aforementioned dth [1] through dth [3] (S62).

Then, in the case that the value of m which is determined in S64 is zero (S64: YES), the density data (data) of the pixel and the dither threshold value dth [1] of the dither matrix Dth [1] at the position corresponding to the pixel are compared. In the case that data>dth [1] (S66: YES), the ink drop data of the pixel is set to "1" (S68).

On the other hand, in the case that data<dth [1] (S66: NO), the ink drop data of the pixel is set to "0" (S70).

In addition, in the case that the value of m which is determined in S64 is not zero (S64: NO), the print data generating unit 17 compares a value which is obtained by subtracting Th [m] from the density data (data) of the pixel (data-Th [m]) and the dither threshold value dth [m+1] of the dither matrix Dth [m+1] at the position that corresponds to the pixel (S72). Note that data-Th [m] is a calculation for designating the density data of the pixel as input data that employs Th [m] as a reference.

Then, in the case that the input data is greater than dth [m+1] (S72: YES), the print data generating unit 17 sets the ink drop data of the pixel to m+1 (S74).

Specifically, the print data generating unit 17 compares data-Th [1] and dth [2] when m is 1, for example. In the case that data-Th [1] is greater than dth [2], the ink drop data of the pixel is set to 2. Thereby, the data "2" are arranged as illustrated in (10) of FIG. 6 through (21) of FIG. 6.

On the other hand, in the case that data-Th [m]≤dth [m+1] in S72 (S72: NO), the dither threshold value dth [m] of the dither matrix Dth [m] at the position that corresponds to the pixel and Th [m]-Th [m−1] are compared (S76).

Here, when Th [m]-Th [m−1] becomes Th [1]-Th [0] when m=1, for example, and a density section from when the data "1" is added until the addition is ceased is illustrated in (1) of FIG. 6 through (9) of FIG. 6. Then, it is necessary for the data "2" to be arranged at the same positions as the data "1" as illustrated in (10) of FIG. 6 through (17) of FIG. 6. This is realized by arranging the data "2" based on the condition of S72.

However, if the condition of S72 is not satisfied, it is necessary to maintain the density at the point in time of Th [1]. Accordingly, in the case that the data "2" is not arranged in S72, it is necessary to arrange the data "1" at the positions where the data "1" are arranged at the point of time of Th [1].

Therefore, in the case that the data of "2" is not arranged in S72 and the dither threshold value dh [1] for the data "1" is less than the density at which the addition of the data "1" is ceased in the conditional formula of S76, the data "1" are arranged (S78). This is because in the case that the dither threshold value dh [1] is less than Th [1]-Th [0], it means that the data "1" are already arranged at these positions.

On the other hand, in the conditional formula of S76, in the case that dth [m] Th [m]-Th [m−1], the ink drop data of the pixel is set to 0 (S80).

Thereby, in the case that the density data of the pixels of the image data is the density section of m=1, the ink drop data of the pixels can be converted into the data "0", "1", or "2". That is, it is possible to smooth the change in print density while incorporating the data "0".

Note that in the description above, a case of m=1 has been described. However, in the case of m=2 as well, the density data in the density section of m=2 may be converted to data "0", "2", or "3" by performing the process based on the conditional formula of S72 and S76. That is, it is possible to smooth the change in print density while incorporating the data "0".

The above is the explanation of the halftone process that includes the first density fluctuation suppressing process.

Next, another embodiment of a halftone process that includes a first density fluctuation suppressing process will be described. The halftone process that includes the aforementioned first density fluctuation suppressing process is the first embodiment, and the other embodiment to be described later is referred to as a second embodiment.

The halftone process that includes the first density fluctuation suppressing process of the first embodiment is a halftone process that employs the dither method as described above, but the first density fluctuation suppressing process of the second embodiment is a halftone process that employs a multiple value error dispersing method. In the case of a halftone process that employs the dither method as in the first embodiment, a memory capacity for storing the dither matrix is required. For example, in the case that a 256×256 dither matrix is employed, a memory capacity of 64 kB is required. On the other hand, the multiple value error dispersing process does not need to store a dither matrix, and therefore a required memory capacity can be reduced. In addition, a calculating process can be realized by simple hardware, and therefore it is possible to reduce hardware requirements as a whole. The memory capacity which is required for multiple value error dispersing processing will be described in detail later.

Figure 10:
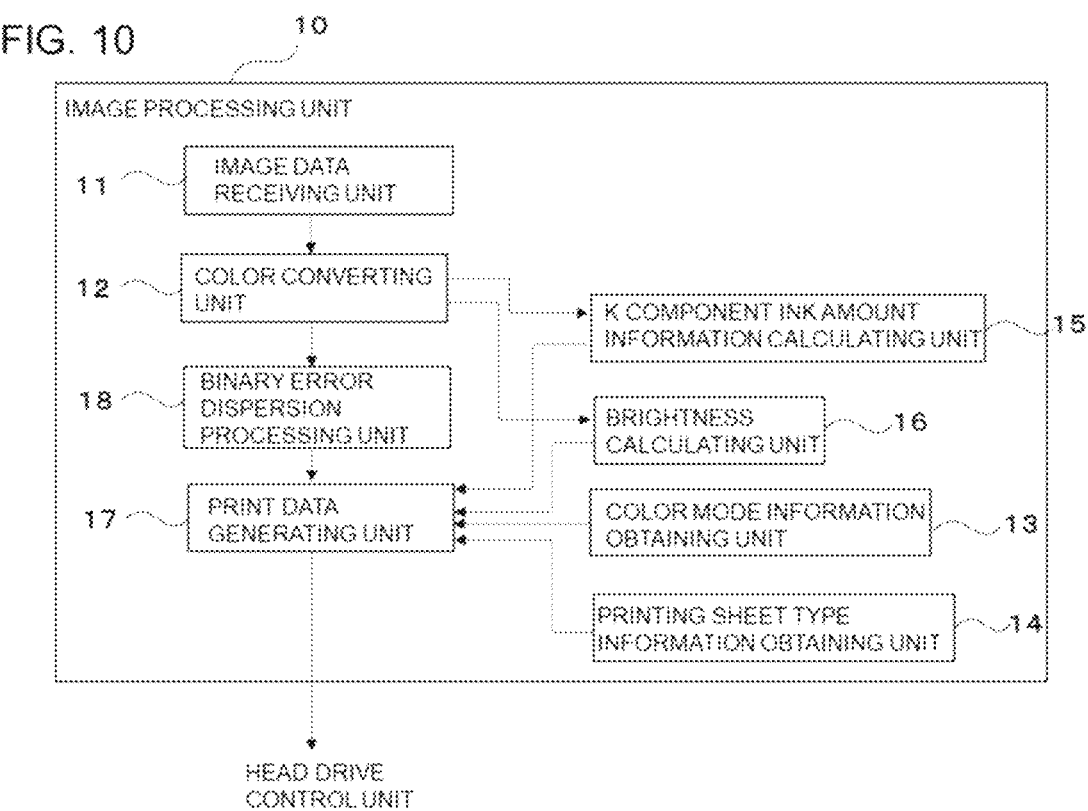
FIG. 10 is a block diagram that illustrates the configuration of an image processing apparatus that performs a halftone process that includes the first density fluctuation suppressing process according to a second embodiment of the present invention.

FIG. 10 is a block diagram that illustrates the configuration of an image processing unit 10 that performs a halftone process that includes a first density fluctuation suppressing process according to the second embodiment. As in the first embodiment, the print data generating unit 17 illustrated in FIG. 10 administers the halftone process such that the image data always includes a zero value except when all of the pixels that constitute the image data are converted to a maximum value (maximum number of drops). The image processing unit 10 illustrated in FIG. 10 includes a binary error dispersing processing unit 18 in order to perform such a halftone process. The print data generating unit 17 illustrated in FIG. 10 performs a multiple value error dispersing process based on the processing result of the binary error dispersion processing unit 18, thereby performing a halftone process that always includes a zero value as described above.

Figure 11:
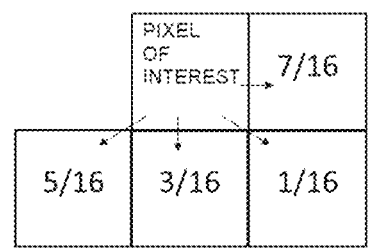
FIG. 11 is a diagram for explaining a binary error dispersing process according to the Floyd-Steinberg dithering algorithm.
Figure 12:
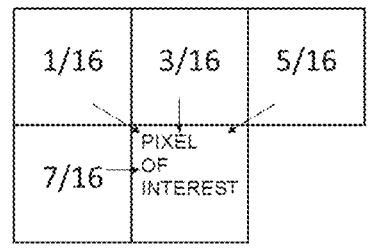
FIG. 12 is a diagram for explaining a binary error dispersing process which is equivalent to the Floyd-Sterling dithering algorithm.

The binary error dispersion processing unit 18 performs a binary error dispersing process on each of the components C, M, Y, and K image data before the halftone process is performed by the print data generating unit 17. A binary error dispersing process according to the Floyd-Steinberg dithering algorithm that employs a dispersion coefficient such as that illustrated in FIG. 11 is known as a binary error dispersing process, for example. The second embodiment employs a method which is equivalent to the Floyd-Steinberg dithering algorithm, to administer a binary error dispersing process. As illustrated in FIG. 11, the Floyd-Steinberg method is a method that disperses errors which are generated in a pixel of interest by multiplying surrounding pixels by a dispersion coefficient. In the second embodiment, a method is employed in which errors in pixels that surround a pixel of interest are multiplied by a dispersion coefficient and distributed to the pixel of interest, as illustrated in FIG. 12. In this method, the error err_bin which is distributed to the pixel of interest is expressed by the equation below. In the equation below, err_mem0 [ ] is a memory that stores errors of a line one line before the line of the pixel of interest, err_pre is errors of a pixel one pixel before the pixel of interest, and err_mem1 [ ] is a memory that stores errors of a line one line after the pixel of interest.

$$\text{err\_bin} = \text{err\_mem0}[x-1] \cdot 1/16 + \text{err\_mem0}[x] \cdot 3/16 + \text{err\_mem0}[x+1] \cdot 5/16 + \text{err\_pre} \cdot 7/16$$

Then, if the density data of the pixel of interest is designated as D, the pixel data Derr after the error is distributed is expressed by the equation below.

$$\text{Derr} = D + \text{err\_bin}$$

In the case that Derr>127, the pixel of interest is judged to be black and a quantization value is set to 255. On the other hand, in the case that Derr≤127, the pixel of interest is judged to be white and the quantization value is set to 0.

Then, the equation: err=Derr−quantization value is calculated, and err_mem1 [x]=err is set as err_pre=err.

By performing the binary error dispersing process by the calculating process as described above, it is possible for the hardware to be a total of two lines of memory, err_mem0 [ ] and err_mem1 [ ]. In addition, if the timings at which the errors are stored are shifted, the errors of the pixel of interest can be written back to the used area of err_mem0 [ ] after reading the errors. Therefore, only one line of memory is practically necessary. Note that the errors which are distributed to the pixels of a first line (y=0) may be set in advance.

Then, the binary error dispersion processing unit 18 performs binary error dispersing process on the image data of C, M, Y, and K, respectively. As a result, a white pixel flag is appended to the pixel which has been judged to be white, that is, the pixel having a quantization value of 0.

Then, when the print data generating unit 17 performs the halftone process by the multiple value error dispersing process, the pixel which has been determined to be white by the binary error dispersion processing unit 18 is always set to a zero value. The multiple value error dispersing process which is performed by the print data generating unit 17 will be described below.

The print data generating unit 17 quantizes the density data of each pixel using a quantization threshold value, and calculates the error from the quantization value and the density data, in a manner similar to the binary error dispersing process.

Figure 13:
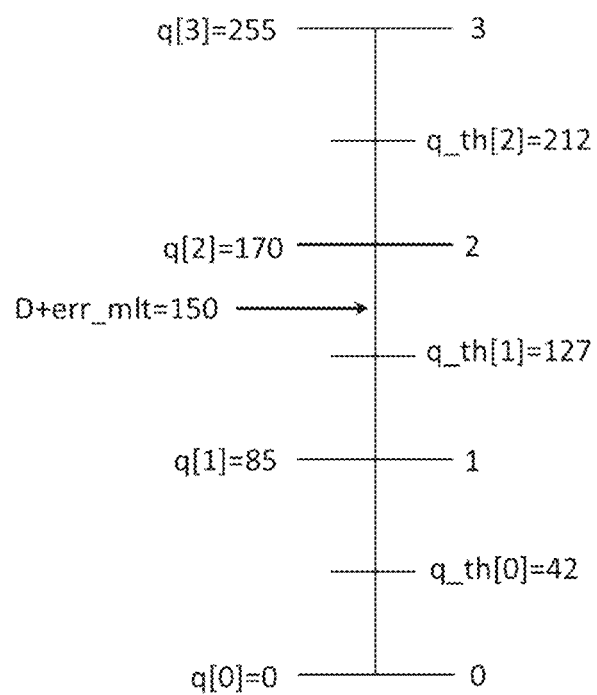
FIG. 13 is a diagram for explaining a multiple value error dispersing process which is performed by the print data generating unit illustrated in FIG. 10.

Specifically, if the quantization value is designated as q [i], the quantization threshold value is designated as q_th [i], and the density data of each pixel is designated as D, in the case that the maximum number of drops is maxdrop=3 each of the values can be set as illustrated in FIG. 13.

Then, as in the binary error dispersing process, if the errors which are distributed from the surrounding pixels to the pixel of interest is designated as err_mlt, the value of i, which determines which of the quantization threshold values q_th [0] through q_th [2] illustrated in FIG. 13 is to be utilized, is obtained by the formula below. Note that INT ( ) is a function that rounds down a number after the decimal point and returns the maximum integer that does not exceed the original number.

$$i=\text{INT}((D+err\_mlt)\cdot maxdrop/255)$$

In the case that D+err mlt=150 as illustrated in FIG. 13, for example, i is calculated by the equation below and becomes 1.

$$i=\text{INT}(150\cdot 3/255)=\text{INT}(1.76)=1$$

At this time, q_th [1]=127 is employed as the quantization threshold value, and D+err_mlt=150 is quantized to q [1]=85 or q [2]=170, but D+err_mlt=150 is greater than q_th [1]=127, the quantization value is q [2]=170. Then, the multiple value data (ink drop data) becomes "2" that corresponds to q [2]=170.

More specifically, Derr is calculated first, and then the value of i is calculated. Then, in the case that i>maxdrop, i=maxdrop is set. Then, in the case that i=maxdrop, the quantization value becomes q [maxdrop], and the multiple value data becomes maxdrop.

In the case that i does not equal maxdrop for a pixel, it is confirmed whether a white pixel flag is appended to the pixel. In the case that the white pixel flag is added, zero is calculated as the quantization value of the pixel, and the multiple value data also becomes zero. Note that with respect to pixels to which the white pixel flag is added, the quantization value thereof becomes zero. However, errors between the input density and the quantization value of zero are compensated for by the surrounding. Therefore, density will not decrease, due to the characteristics of error dispersion.

On the other hand, in the case that the white pixel flag is not added and Derr>q_th [i], q [i+1] is calculated as the quantization value, the multiple value data becomes i+1. In the case that Derr≤q_th [i], q [i] is calculated as the quantization value, and the multiple value data becomes i.

Figure 14:
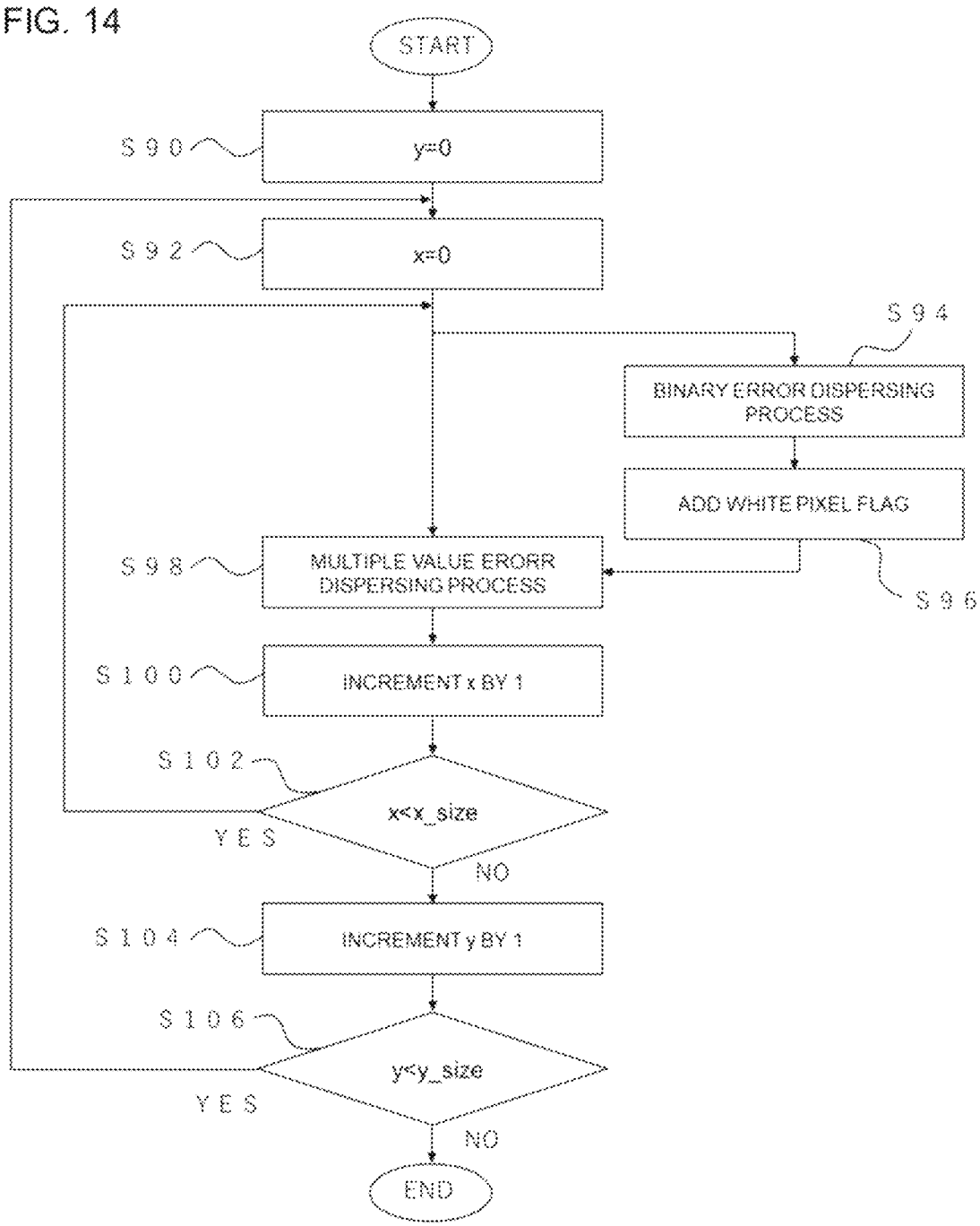
FIG. 14 is a flow chart for explaining the flow of a calculating process of the halftone process that includes the first density fluctuation suppressing process according to the second embodiment.

Next, the flow of a calculating process of the halftone process that employs the aforementioned multiple value error dispersing process will be described with reference to the flowchart illustrated in FIG. 14

First, the print data generating unit 17 sets the y coordinate and the x coordinate of the pixels that constitute the image data to y=0 (S90) and x=0 (S92), respectively. The initial values of the x coordinate and y coordinate of the pixels that constitute the image data are zero.

Then, a binary error dispersing process is performed on the density data of a pixel at the position of the x coordinate and the y coordinate which are set in S90 and S92 (S94). In the case that the pixel is judged to be white, a white pixel flag is added to the pixel (S96).

Next, a multiple value error dispersing process is performed on the density data of the pixel at the x coordinate and y coordinate positions which are set in S90 and S92, and the multiple value data of the pixel is calculated (S98). When performing the multiple value error dispersing process, the white pixel flag which is added in S96 as described above is referred to.

Next, the print data generating unit 17 increments the x coordinate by 1 (S100). In the case that the value of x is less than the size of the image data in the x direction (x_size) (S102: YES), the processes of S94 through S100 are repeated.

Then, in S102, in the case that x≥x_size (S102: NO), the print data generating unit 17 increments the y coordinate by 1 (S104). In the case that the value of y is less than the size of the image data in the y direction (y size) (S106: YES), the processes of S92 to S104 are repeated.

The print data generating unit 17 ends the process in the case that y≥y_size in S106 (S106: NO). As a result, multiple value data (ink drop data) can be obtained for all of the pixels that constitute the image data.

Next, a modification of the halftone process that employs the multiple value error dispersing processing of the above second embodiment will be described. In the halftone process that employs the multiple value error dispersing processing of the above second embodiment, a white pixel flag is added to pixels which are judged to be white by performing the binary error dispersing process, and the multiple values of these pixels are forcibly set to zero. However, in regions with bright densities, the density of white pixels is high as a matter of course. Therefore, in the case that the above process is performed, the quantization values of the multiple value error diffusion for most pixels will be zero. In such a state, the errors of the pixels of which the quantization values were set to zero in the multiple value error dispersing process accumulates, and the quantization value will become drastically large in a printable area. For example, in a portion where the density is bright, it is desired to incorporate 0 drop and 1 drop. However, 0 drop and 3 drops are incorporated, and the granularity of the printed image deteriorates.

Figure 15:
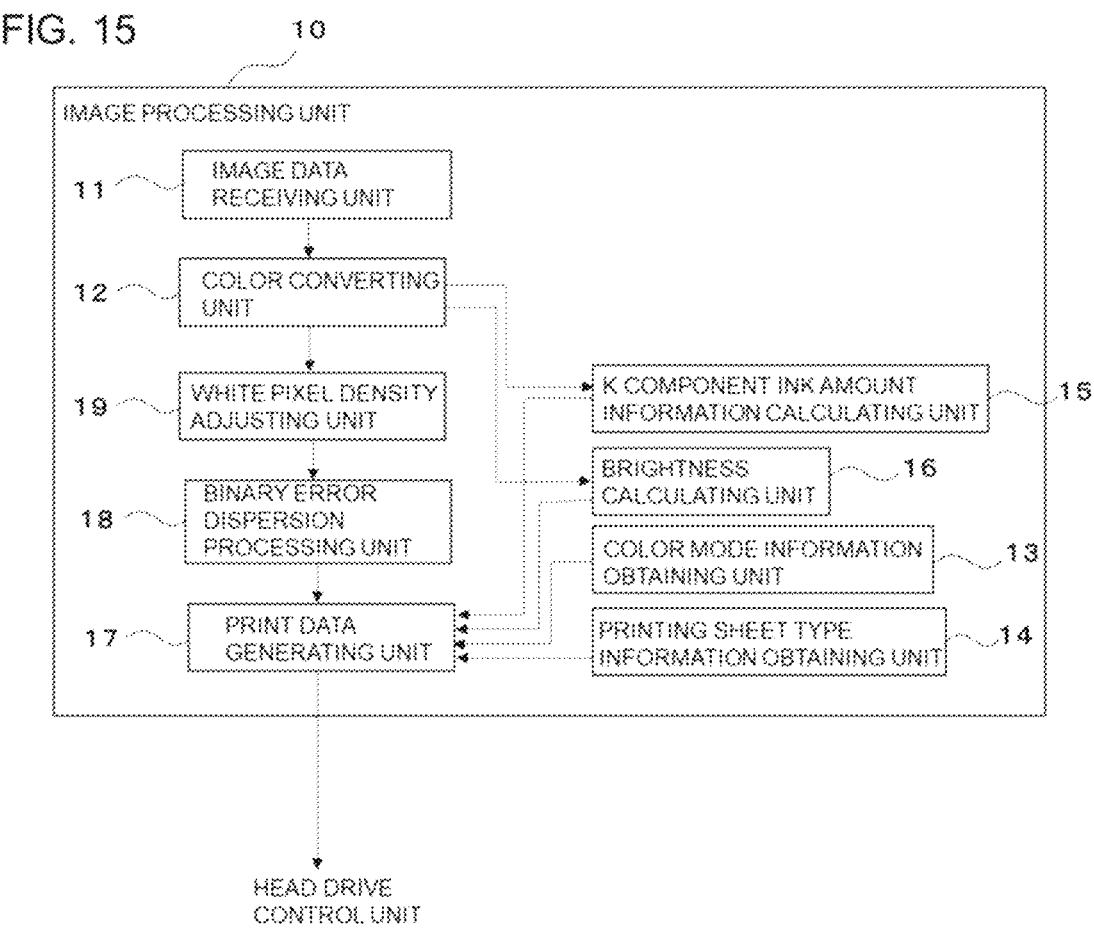
FIG. 15 is a block diagram that illustrates the configuration of a modification of the image processing unit illustrated in FIG. 10.

Therefore, in the modification of the second embodiment, the density of white pixels is prevented from becoming excessively high after the binary error dispersing process. FIG. 15 is a diagram that illustrates the configuration of a modification of the image processing unit 10 of the second embodiment. As illustrated in FIG. 15, the modification of the image processing unit 10 of the second embodiment is further equipped with a white pixel density adjusting unit 19.

The white pixel density adjusting unit 19 performs a density converting process as a white pixel density adjusting process on each of the C, M, Y, and K image data which are input. Specifically, the white pixel density adjusting unit 19 administers a density converting process that causes the density of pixels, which are judged to be white as the input density of image data is brighter or darker, to be sparse, and maximizes the density of pixels which are judged to be white at an intermediate density, on each of the image data as illustrated in FIG. 16.

Figure 16:
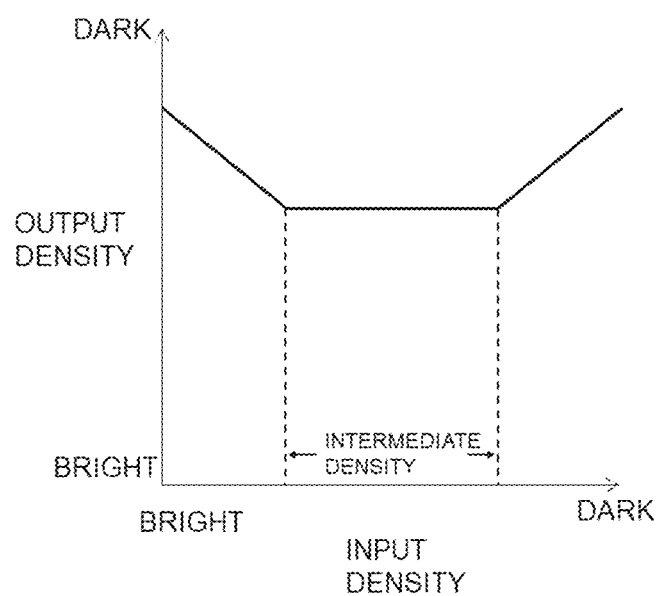
FIG. 16 is a diagram for explaining an example of a density converting process for performing white pixel density adjustments.

In the graph illustrated in FIG. 16, the output density is controlled such that the white pixel density is sufficient to reduce wind ripple fluctuations at the intermediate density. The output density is also controlled such that in a portion brighter than the intermediate density, the output density becomes darker (white pixel density becomes sparse) with respect to the input density the brighter the portion is, and at a portion darker than the intermediate density, the output density becomes darker (white pixel density becomes sparse) with respect to the input density the darker the portion is The method for realizing the density conversion process may be a look up table or a function such as a predetermined linear expression.

Then, the binary error dispersion processing unit 18 performs a binary error dispersing process on each component of image data which has undergone the density conversion processing by the white pixel density adjusting unit 19. The modification of the second embodiment described above is the same as that of the second embodiment in the configurations other than the white pixel density adjusting unit 19.

According to the modification of the second embodiment, the density of the pixels which are judged to be white is made more sparse in a portion at which the input density of the image data is brighter, such that deterioration of graininess can be prevented.

In addition, the method of adjusting the density of white pixels after the binary error dispersing process is not limited to the above method, and the binary error dispersion processing unit 18 may adjust the density of the pixels which are judged to be white.

Figure 17:
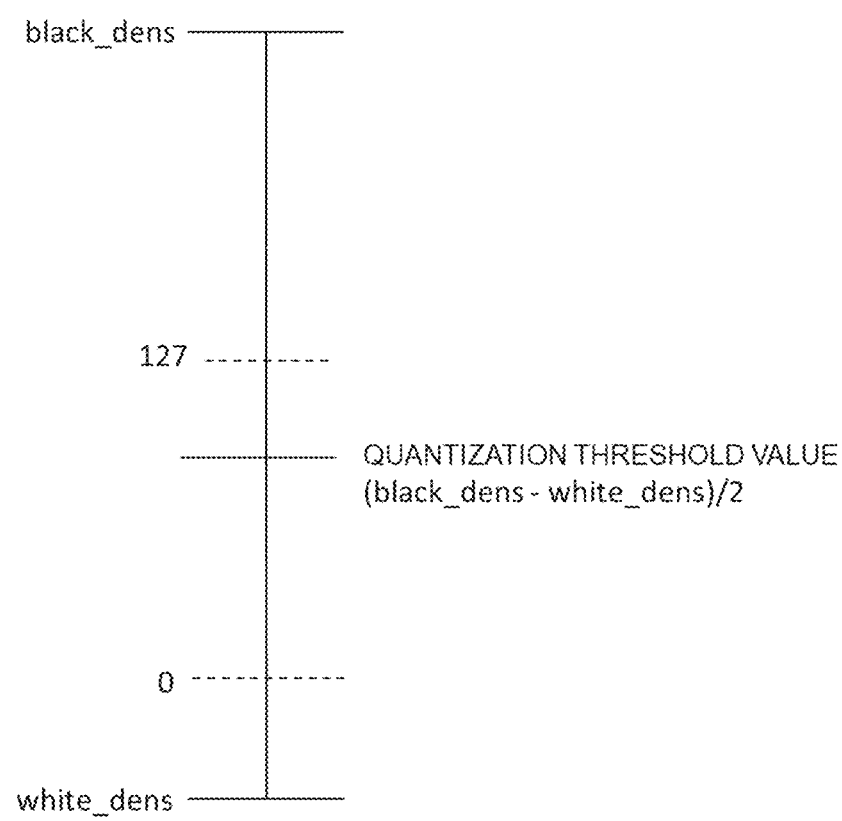
FIG. 17 is a diagram for explaining a method for adjusting white pixel density in a binary error dispersing process.

Specifically, the quantization value of a pixel which is judged to be white is set to a negative value, and the quantization threshold value is set based on the negative value and the quantization value of a pixel which is judged to be black, and the binary error dispersing process is performed. Specifically, the quantization value of a pixel which is judged to be white is set to a negative value white_dens (for example, −20), and the negative value white_dens and the quantization value of a pixel which is judged to be black are black dens (255), as illustrated in FIG. 17. The quantization threshold value (137) is calculated based on these values, and the binary error dispersing process is performed. In the case that the quantization value is set to a negative value (−20) as described above, even if an input density is 0, an error is the input density (0)—the quantization value (−20)=20. Therefore, a positive error is distributed among peripheral pixels. That is, the binary error dispersing process functions to cause the density of the peripheral pixels to become more dense, thereby causing the density of white pixels to become sparce. By applying such a binary error dispersing process to a portion brighter than the intermediate density of the image data, the density of white pixels after the binary error dispersing process can be made sparse. Thereby, it is possible to prevent deterioration of granularity even in a portion where the density is bright, as in the modification described above.

Figure 18:
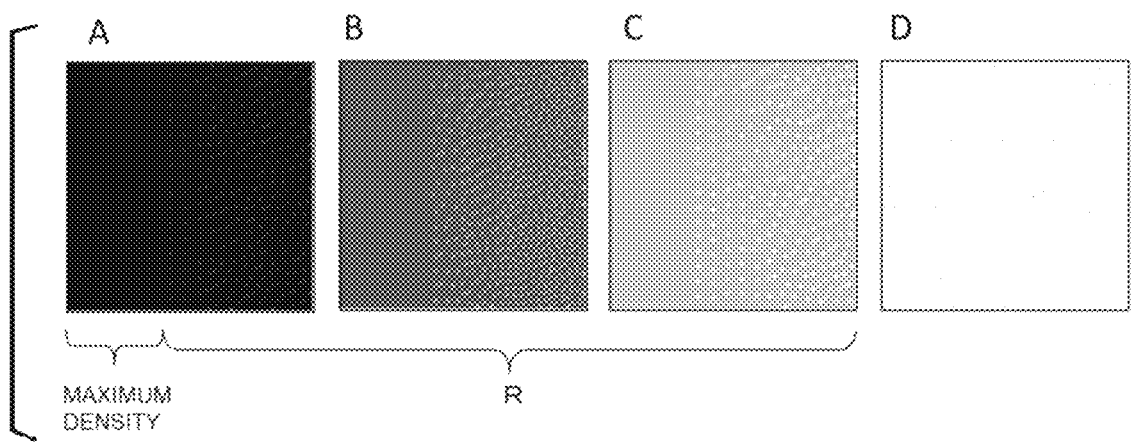
FIG. 18 is a diagram that illustrates the result of administering an existing multiple value error dispersing process on a monochrome gradation image.

A of FIG. 18 through D of FIG. 18 are diagrams that illustrate the results of administering an existing multiple value error dispersing process to a monochrome gradation image. A of FIG. 18 through D of FIG. 18 are diagrams in which a portion of the gradation image which is subjected to the multiple value error dispersing process is extracted, and the density becomes lighter from A to D. A of FIG. 18 includes a portion which is converted to a maximum density. Wind ripple fluctuations are likely to occur in a density range R if only the existing multiple value error dispersing process is administered.

Figure 19:
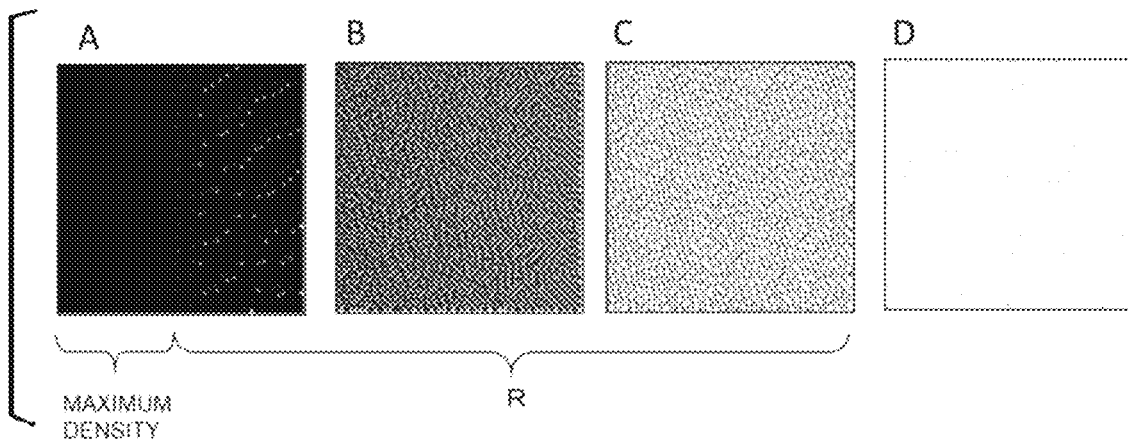
FIG. 19 is a diagram that illustrates the result of administering a halftone process according to the second embodiment of the present invention on a monochrome gradation image.

A of FIG. 19 through D of FIG. 19 are diagrams that illustrate the results of administering the halftone process of the second embodiment to the same monochrome gradation image as that of A of FIG. 18 through D of FIG. 18. In A of FIG. 19 through D of FIG. 19, white pixels (zero values) are included in all portions except for a portion which is converted to a maximum density. Particularly, it can be seen that white pixels are included in the solidly filled portions of B of FIG. 19 and C of FIG. 19. Thereby, the influence of wind ripple fluctuations can be suppressed in the density range R.

The following additional items are further disclosed with respect to the image processing apparatus of the present invention.

(Additional Items)

The image processing apparatus of the present invention may be further equipped with: a color mode information obtaining unit that obtains color mode information which indicates whether color printing or monochrome printing is to be performed based on the image data; and a printing sheet type information obtaining unit that obtains printing sheet information, which is information that indicates the type of the printing sheet on which a printing process based on the image data is administered. In this case, the print data generating unit administers a first halftone process that results in the print data always including a zero value except for a case in which all of the pixels that constitute the image data are converted into a maximum value as a halftone process that includes a density fluctuation suppressing process, and switching between the first halftone process and a different halftone process that includes a density fluctuation suppressing process having a different degree of density fluctuation suppression from the first halftone process, based on the color mode information and the printing sheet type information.

In the image processing apparatus of the present invention, the print data generating unit may perform a halftone process that includes a density fluctuation suppressing process in the case that information that indicates a printing sheet with a degree of bleeding less than or equal to a threshold value is received as the printing sheet type information.

In addition, in the image processing apparatus of the present invention, in the case that the print data generating unit receives information that indicates color printing as the color mode information and information that indicates a printing sheet which has a degree of bleeding less than or equal to a threshold value as the printing sheet type information, a halftone process that includes a density fluctuation suppressing process may be performed such that the print data of the K component does not include minimum drop print data as the different halftone process.

Further, the image processing apparatus of the present invention may be further equipped with the K component ink amount information calculating unit that calculates ink amount information of the K component based on the image data, and the brightness calculating unit that calculates the brightness of color components other than the K component, based on the image data. The print data generating unit is capable of switching among a plurality of the different halftone processes based on the ink amount information of the K component and the brightness of the color components.

Yet still further, in the image processing apparatus of the present invention, the print data generating unit may convert the image data into multiple value data that includes an n value (n is an integer greater than or equal to 0) and an n+1 value according to the density of the image data. During the conversion process, after ceasing the increase of n+1 value pixels at a stage in which the number of zero value pixels reaches a predetermined number in the multiple value data, n+2 values may be arranged at the same positions as the n+1 values according to the increase in the density of the image data.

In addition, in the image processing apparatus of the present invention, the print data generating unit may perform a halftone process such that pixels having zero values are adjacent to pixels having a value of one, and greater than or equal to two pixels having values of one are not continuous.

Further, in the image processing apparatus of the present invention, the print data generating unit may perform a halftone process such that the percentage of zero values which are included in the entirety of the multiple value data decreases as the number of multiple value data that corresponds to each pixel increases.

Still further, the image processing apparatus of the present invention may be equipped with a binary error dispersion processing unit that performs a binary error dispersing process on the image data before the halftone process is performed by the print data generating unit, the print data generating unit may perform the halftone process, and the print data generating unit setting the quantization value and the multiple value data of pixels which are judged to be white by the binary error dispersion processing unit are to zero values when performing the halftone process Still yet further, the image processing apparatus of the present invention may be equipped with a white pixel density adjusting unit for administering a white pixel density adjusting process for adjusting the density of pixels which will be judged to be white by the binary error dispersing process on the image data before the binary error dispersing process by the binary error dispersion processing unit. The binary error dispersion processing unit may perform a binary error dispersing process on the image data to which the white pixel density adjusting process has been performed.

In addition, in the image processing apparatus of the present invention, the binary error dispersion processing unit may set the quantization value of a pixel which is judged to be white as a negative value, a quantization threshold value may be set based on the negative value and the quantization value of a pixel which is judged to be black, and then a binary error dispersing process may be performed.

Further, the image processing apparatus of the present invention may be configured such that the brighter the density of the image data, the less the density of the pixels which are judged to be white.

What is claimed is:

1. An image processing apparatus, comprising:
    an image data receiving unit that receives image data; and
    a print data generating unit that generates multiple value data as print data by performing a halftone process on the image data and converting the image data into at least three values;
    the print data generating unit administering a halftone process that includes a density fluctuation suppressing process that results in the print data always including a zero value except for a case in which all of the pixels that constitute the image data are converted into a maximum value.

2. The image processing apparatus as defined in claim 1, wherein:
    the print data generating unit converts the image data into multiple value data that includes an n value (n is an integer greater than or equal to 0) and an n+1 value according to the density of the image data, and during the conversion process, after ceasing the increase of the n+1 value pixels at a stage in which the number of zero value pixels reaches a predetermined number in the multiple value data, n+2 values are arranged at the same positions as the n+1 values according to the increase in the density of the image data.

3. The image processing apparatus as defined in claim 1, wherein:
    the print data generating unit performs the halftone process such that pixels having zero values are adjacent to pixels having a value of one, and greater than or equal to two pixels having values of one are not continuous.

4. The image processing apparatus as defined in claim 1, wherein:
    the print data generating unit performs the halftone process such that the percentage of zero values which are included in the entirety of the multiple value data decreases as the number of multiple value data that corresponds to each pixel increases.

5. The image processing apparatus as defined in claim 1, further comprising:
    a binary error dispersion processing unit that performs a binary error dispersing process on the image data before the halftone process is performed by the print data generating unit;
    the print data generating unit setting the quantization value and the multiple value data of pixels which are judged to be white by the binary error dispersion processing unit are to zero values when performing the halftone process.

6. The image processing apparatus as defined in claim 5, further comprising:
    a white pixel density adjusting unit for administering a white pixel density adjusting process for adjusting the density of pixels which will be judged to be white by the binary error dispersing process on the image data before the binary error dispersing process by the binary error dispersion processing unit; wherein:
    the binary error dispersion processing unit performs a binary error dispersing process on the image data to which the white pixel density adjusting process has been performed.

7. The image processing apparatus as defined in claim 5, wherein:
    the binary error dispersion processing unit sets the quantization value of a pixel which is judged to be white as a negative value, sets a quantization threshold value based on the negative value and the quantization value of a pixel which is judged to be black, and then performs the binary error dispersing process.

8. The image processing apparatus as defined in claim 6, wherein:
the brighter the density of the image data, the less the density of the pixels which are judged to be white.

9. The image processing apparatus as defined in claim 7, wherein:
the brighter the density of the image data, the less the density of the pixels which are judged to be white.

10. The image processing apparatus as defined in claim 1, further comprising:
a color mode information obtaining unit that obtains color mode information which indicates whether color printing or monochrome printing is to be performed based on the image data; and
a printing sheet type information obtaining unit that obtains printing sheet information, which is information that indicates the type of the printing sheet on which a printing process based on the image data is administered;
the print data generating unit administering a first halftone process that results in the print data always including a zero value except for a case in which all of the pixels that constitute the image data are converted into a maximum value as a halftone process that includes a density fluctuation suppressing process, and switching between the first halftone process and a different halftone process that includes a density fluctuation suppressing process having a different degree of density fluctuation suppression from the first halftone process, based on the color mode information and the printing sheet type information.

11. The image processing apparatus as defined in claim 10, wherein:
the print data generating unit performs the first halftone process that includes density fluctuation suppressing process in the case that information that indicates a printing sheet with a degree of bleeding less than or equal to a threshold value is received as the printing sheet type information.

12. The image processing apparatus as defined in claim 10, wherein:
a halftone process that includes a density fluctuation suppressing process is performed such that the print data of the K component does not include minimum drop print data as the different halftone process, in the case that the print data generating unit receives information that indicates color printing as the color mode information and information that indicates a printing sheet which has a degree of bleeding less than or equal to a threshold value as the printing sheet type information.

13. The image processing apparatus as defined in claim 10, further comprising:
a K component ink amount information calculating unit that calculates ink amount information of the K component based on the image data; and
a brightness calculating unit that calculates the brightness of color components other than the K component, based on the image data; wherein:
the print data generating unit switches among a plurality of the different halftone processes based on the ink amount information of the K component and the brightness of the color components.

* * * * *